United States Patent
Park et al.

(10) Patent No.: US 9,065,616 B2
(45) Date of Patent: Jun. 23, 2015

(54) METHODS OF TRANSMITTING AND RECEIVING DATA IN MOBILE TRANSMISSION SYSTEM

(75) Inventors: Sung Jun Park, Anyang-si (KR); Young Dae Lee, Anyang-si (KR); Seon Don Lee, Anyang-si (KR); Seung June Yi, Anyang-si (KR); Sung Duck Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 784 days.

(21) Appl. No.: 12/677,739

(22) PCT Filed: Sep. 11, 2008

(86) PCT No.: PCT/KR2008/005387
§ 371 (c)(1),
(2), (4) Date: Apr. 1, 2010

(87) PCT Pub. No.: WO2009/035280
PCT Pub. Date: Mar. 19, 2009

(65) Prior Publication Data
US 2010/0202382 A1   Aug. 12, 2010

Related U.S. Application Data

(60) Provisional application No. 60/971,921, filed on Sep. 13, 2007.

(30) Foreign Application Priority Data

Oct. 11, 2007  (KR) .................. 10-2007-0102696
Dec. 10, 2007  (KR) .................. 10-2007-0127779

(51) Int. Cl.
*H04W 4/00* (2009.01)
*H04J 3/00* (2006.01)
(Continued)

(52) U.S. Cl.
CPC ............ *H04L 5/0053* (2013.01); *H04W 72/04* (2013.01); *H04L 5/0007* (2013.01); *Y02B 60/50* (2013.01)

(58) Field of Classification Search
CPC ..................................................... H04W 72/04
See application file for complete search history.

(56) References Cited

U.S. PATENT DOCUMENTS 6,421,334 B1   7/2002   Baines
6,870,824 B1   3/2005   Kim et al.
(Continued)

FOREIGN PATENT DOCUMENTS

KR   10-2004-0008228 A   1/2004
KR   10-2005-0014984 A   2/2005
(Continued)

OTHER PUBLICATIONS

LG Electronics Inc., "Discussion on MCCH Update," 3GPP TSG-RAN WG2 #59, Agenda Item 4.7.1, R2-073509, Aug. 20-24, 2007, Athens, Greece, 2 pages.
(Continued)

*Primary Examiner* — Samina Choudhry
(74) *Attorney, Agent, or Firm* — Birch, Stewart, Kolasch & Birch, LLP

(57) ABSTRACT

A method for transmitting and receiving data in a mobile communication system is disclosed. The data transmission method for allowing a transmission end of the mobile communication system to transmit data to at least one reception end via at least one physical channel includes, transmitting a reception indicator, which indicates whether at least one second physical channel is received, via a first physical channel, such that at least one reception end can determine whether the at least one second physical channel is received using the reception indicator, and transmitting data via a third physical channel controlled by the first physical channel. So, a sleeping time for reducing power consumption can be explicitly indicated by the above data communication method, such that power consumption required for transmitting and receiving data can be minimized.

18 Claims, 11 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 7,209,747 B2 | 4/2007 | Chen | |
| 2001/0024956 A1* | 9/2001 | You et al. | 455/455 |
| 2002/0126629 A1 | 9/2002 | Jiang et al. | |
| 2003/0103476 A1* | 6/2003 | Choi et al. | 370/329 |
| 2003/0224790 A1 | 12/2003 | Choi | |
| 2004/0208142 A1 | 10/2004 | Saw | |
| 2005/0041681 A1* | 2/2005 | Lee et al. | 370/437 |
| 2005/0190712 A1* | 9/2005 | Lee et al. | 370/312 |
| 2005/0220042 A1 | 10/2005 | Chang et al. | |
| 2005/0249163 A1* | 11/2005 | Kim et al. | 370/335 |
| 2006/0035662 A1 | 2/2006 | Jeong et al. | |
| 2006/0104225 A1 | 5/2006 | Kim et al. | |
| 2006/0116136 A1 | 6/2006 | Noma | |
| 2006/0251023 A1 | 11/2006 | Choi | |
| 2007/0049325 A1 | 3/2007 | Lee | |
| 2007/0115894 A1 | 5/2007 | Herrmann et al. | |
| 2007/0183372 A1 | 8/2007 | Janko et al. | |
| 2007/0202892 A1 | 8/2007 | Voyer | |
| 2008/0081645 A1 | 4/2008 | Kim et al. | |
| 2008/0159323 A1* | 7/2008 | Rinne et al. | 370/431 |
| 2008/0186892 A1* | 8/2008 | Damnjanovic | 370/311 |
| 2008/0188247 A1 | 8/2008 | Worrall | |
| 2009/0034452 A1* | 2/2009 | Somasundaram et al. | 370/328 |
| 2009/0086853 A1 | 4/2009 | Ye | |
| 2009/0290523 A1 | 11/2009 | Lee et al. | |

FOREIGN PATENT DOCUMENTS

| | | |
|---|---|---|
| KR | 10-2005-0026254 A | 3/2005 |
| KR | 10-2005-0080946 A | 8/2005 |
| KR | 10-0556589 B1 | 2/2006 |
| KR | 10-2006-0024756 A | 3/2006 |
| KR | 10-2006-0069106 A | 6/2006 |
| KR | 10-2007-0080188 A | 8/2007 |
| KR | 10-2007-0120453 A | 12/2007 |
| WO | WO 2006/096036 A1 | 9/2006 |
| WO | WO 2006/118426 A1 | 11/2006 |

OTHER PUBLICATIONS

LG Electronics Inc., "Transmission of LTE Paging," 3GPP TSG-RAN WG2 #59, Agenda Item 4.10, R2-073356, Aug. 20-24, 2007, Athens, Greece, 3 pages.

Nokia et al., "Paging Occasions in LTE," 3GPP TSG-RAN WG2 Meeting #59, Agenda Item 4.10, 5.3.1, R2-073073, Aug. 20-24, 2007, Athens, Greece, 3 pages.

* cited by examiner

METHODS OF TRANSMITTING AND RECEIVING DATA IN MOBILE TRANSMISSION SYSTEM

CROSS REFERENCE TO RELATED APPLICATIONS

This application is the National Phase of PCT/KR2008/005387 filed on Sep. 11, 2008 which claims priority under 35 U.S.C 119 (e)of U.S. Provisional Application No. 60/971,921 filed on Sep. 13, 2007 and under 35 U.S.C 119 (a) to Patent Application Nos. 10-2007-0102696 filed in Korea on Oct. 11, 2007 and 10-2007-0127779 filed in Korea on Dec. 10, 2007. The entire contents of the above applications are hereby incorporated by reference into the present application.

TECHNICAL FIELD

The present invention relates to a mobile communication system, and more particularly to a data communication method between an eNode-B and each user equipment (UE) for use in a mobile communication system.

BACKGROUND ART

Typically, a code division multiple access (CDMA) transmission scheme for use in a universal mobile telecommunication system (UMTS) acting as a third-generation wireless communication system has difficulty in processing large amounts of wireless data, such that many developers are conducting intensive research into an orthogonal frequency division multiplexing (OFDM) transmission scheme acting as a fourth-generation wireless communication system. The OFDM transmission scheme is also applied to an Evolved-Universal Mobile Telecommunications System (E-UMTS) acting as a fourth-generation mobile communication system based on the above UMTS.

FIG. 1 is a structural diagram illustrating a network structure of the E-UMTS acting as a fourth-generation mobile communication system. The E-UMTS system is developed from a conventional Wideband Code Division Multiple Access (WCDMA) UMTS system as previously stated above, and conducts intensive research into a basic standardization process in the current 3rd Generation Partnership Project (3GPP). The E-UMTS system may also be called a Long Term Evolution (LTE) system. Detailed descriptions of technical specifications of the UMTS or E-UMTS have been prescribed in Releases 7 and 8 of Technical Specification Group Radio Access Network of the 3rd Generation Partnership Project (GPP).

Referring to FIG. 1, an Evolved Universal Terrestrial Radio Access Network (E-UTRAN) includes a plurality of eNode-Bs (also called eNBs). The eNode-Bs (eNBs) are connected to each other via an X2 interface. Each eNB is connected to a user equipment (UE) via a wireless interface, and is connected to an Evolved Packet Core (EPC) via an S1 interface.

The E-UMTS system uses an orthogonal frequency division multiplexing (OFDM) scheme in a downlink, and uses a Single Carrier-Frequency Division Multiple Access (SC-FDMA) scheme in an uplink. The OFDM system acting as a multi-carrier scheme allocates resources on the basis of a plurality of subcarriers grouping some carriers, and uses an Orthogonal Frequency Division Multiple Access (OFDMA) scheme as an access scheme.

Active carriers for use in a physical layer of the OFDM or OFDMA system are divided into a plurality of groups, such that the divided active carriers are transmitted to different reception ends of individual groups. Radio resources allocated to individual UEs are defined by a two-dimensional (2D) time-frequency region (also called a 2D time-frequency domain), and are considered to be a set of consecutive subcarriers. A single time-frequency domain of the OFDM or OFDMA system is denoted by a rectangle decided by time coordinates and subcarrier coordinates. In other words, a single time-frequency domain can be denoted by a rectangle defined by both a symbol of at least one time axis and a sub-carrier of several frequency axes.

The time-frequency domain may be allocated to an uplink of a specific user equipment (UE). In a downlink, an eNode-B may transmit the time-frequency domain to a specific UE. In order to define the above-mentioned time-frequency domain in a two-dimensional (2D) space, a predetermined number of OFDM symbols must be provided to the time domain, and a predetermined number of consecutive subcarriers must be provided to the frequency domain such that the consecutive subcarriers will begin at a predetermined position which is spaced apart from a reference point of the frequency domain by a predetermined offset.

In the Evolved Universal Mobile Telecommunications System (E-UMTS) system being intensively researched by many developers, radio frames of 10 ms have been used, and a single radio frame includes 10 subframes. In other words, a single subframe corresponds to the duration of 1 ms. A single resource block includes a single subframe and 12 subcarriers. Each of the 12 subcarriers includes a band of 15 kHz. A single subframe includes several OFDM symbols. Some parts (e.g., a first symbol) of the several OFDM symbols may be used to transmit L1/L2 control information.

FIG. 2 is a conceptual diagram illustrating a physical channel structure for use in the E-UMTS system. Referring to FIG. 2, a single sub-frame includes a hatched part serving as an L1/L2 control information transmission part and a non-hatched part serving as a data transmission area.

Radio interface protocol layers between the UE and the network including the eNode-B are classified into a first layer (L1), a second layer (L2), and a third layer (L3) on the basis of three lower layers of an Open System Interconnection (OSI) reference model well known to a communication system field. The first layer (L1) provides an information transfer service using a physical channel. A radio resource control (RRC) layer located at the third layer (L3) controls radio resources between the UE and the network. For this operation, the RRC layer exchanges the RRC message between the UE and the network. The RRC layer may be distributed to network nodes (e.g., eNode-B and AG), or may also be located independent of the eNode-B or the AG.

FIG. 3 is a conceptual diagram illustrating an Evolved Universal Terrestrial Radio Access Network (E-UTRAN). In FIG. 3, a hatched part shows functional entities of a user plane, and a non-hatched part shows functional entities of a control plane.

FIGS. 4A and 4B show a radio interface protocol structure between the UE and the E-UTRAN. FIG. 4A shows a control plane protocol structure, and FIG. 4B shows a user plane protocol structure.

Referring to FIGS. 4A and 4B, a radio interface protocol includes a physical layer, a data link layer, and a network layer in a horizontal direction. In a vertical direction, the radio interface protocol includes a user plane for transmitting data information and a control plane for transmitting control signals (i.e., signaling messages). The protocol layers shown in FIGS. 4A and 4B can be classified into a first layer (L1), a second layer (L2), and a third layer (L3) on the basis of three lower layers of an Open System Interconnection (OSI) reference model well known to a communication system field.

A physical layer serving as the first layer (L1) transmits an information transfer service to an upper layer over a physical channel. The physical layer is connected to a Medium Access Control (MAC) layer serving as an upper layer over a transport channel. Data is transferred from the MAC layer to the physical layer over the transport channel, or is also transferred from the physical layer to the MAC layer over the transport channel. Data is transferred among different physical layers over the physical channel. In other words, data is transferred from a transmitting physical layer to a receiving physical layer over the physical channel. In the case of the E-UMTS system, the above-mentioned physical channel is modulated according to an orthogonal frequency division multiplexing (OFDM) scheme, so that the E-UMTS system uses time and frequency information as radio resources.

The MAC layer of the second layer (L2) transmits services to a Radio Link Control (RLC) layer serving as an upper layer over a logical channel. The Radio Link Control (RLC) layer of the second layer (L2) supports transmission of reliable data. A PDCP layer of the second layer (L2) performs header compression to reduce an amount of unnecessary control information, such that transmission (Tx) data of IP packets (e.g., IPv4 or IPv6 packets) can be effectively transmitted in a relatively narrow-bandwidth air space.

The radio resource control (RRC) layer located at the bottom of the third layer (L3) is defined on a control plane only. In association with configuration, re-configuration, and release of radio bearers (RBs), the RRC layer controls the logical channels, the transport channels, and the physical channels. In this case, the above radio bearer (RB) is provided from the second layer (L2) to perform data communication between the UE and the UTRAN.

The OFDM-based wireless communication scheme uses a variety of downlink transport channels for transmitting data from the eNode-B to the UE, for example, a broadcast channel (BCH) for transmitting system information, a paging channel (PCH) for transmitting paging messages, and a downlink shared channel (DL-SCH) for transmitting user traffic or control messages. Traffic or control messages of a downlink multicast or a broadcast service may be transmitted over a downlink SCH (DL-SCH), or may also be transmitted over an additional downlink multicast channel (MCH). In the meantime, there are a variety of uplink transport channels for transmitting data from the UE to the network, for example, a random access channel (RACH) for transmitting initial control messages, and an uplink shared channel (UL-SCH) for transmitting user traffic or control messages.

A variety of logical channels located on the transport channels are mapped to the transport channels. For example, the logical channels may be a broadcast channel (BCCH), a paging control channel (PCCH), a common control channel (CCCH), a multicast control channel (MCCH), and a multicast traffic channel (MTCH).

In order to transmit most signals except for either specific control signals or specific service data, the eNode-B and the UE use the DL-SCH as a transport channel. The eNode-B and the UE transmit and receive data over a Physical Downlink Shared Channel (PDSCH) to which the DL-SCH is allocated. Also, information indicating which one of UEs (one or more UEs) will receive PDSCH data, the other information indicating how to receive PDSCH data in the above UEs or how to decode the PDSCH data may be transmitted over a Physical Downlink Control Channel (PDCCH). The PDCCH transmits transport formats associated with the DL-SCH and PCH, resource allocation information, and hybrid ARQ information.

During a connection time between the UE and the E-UTRAN, in association with a specific PDCCH which is CRC-masked with a Radio Network Temporary Identity (RNTI), if one or two more UEs contained in a cell receiving the specific PDCCH determine the presence of another PDCCH masked with the same RNTI as those of the above UEs, the one or two more UEs receive their associated PDSCH via the received PDCCH information.

FIG. 5 shows exemplary methods for transmitting data from an eNode-B (eNB) to a user equipment (UE). Referring to FIG. 5, if the UE receives specific data from the eNode-B (eNB) over a data channel such as PDSCH, the eNB can transmit specific data for a predetermined period of time to reduce an amount of power consumption, or can also transmit the specific data after the lapse of a specific time interval after a certain event has occurred. Therefore, the UE has only to receive data from the eNB during the above specific time only, such that it is able to reduce an amount of power consumption in the remaining times other than the above specific time.

However, the above specific data may have different amounts of information (i.e., different numbers of bits) according to various situations. Also, a Long Term Evolution (LTE) system supporting large amounts of wireless data basically considers a dynamic scheduling scheme, such that the number of bits contained in transmittable information is also dynamically changed to another according to a current channel situation. In other words, the amount of requested radio resources may be changed whenever the above-mentioned specific data is transmitted. For example, in order to transmit the above-mentioned specific data, 5 subframes or 10 subframes may be needed.

Provided that the above specific data is transmitted for successive Transmission Timing Interval (TTIs) and 5 TTIs are requested for a current situation, the eNB transmits the specific data associated with the above UE during the 5 TTIs. For the convenience of description, the following description assumes that the above-mentioned Transmission Timing Interval (TTI) corresponds to the length of a single subframe. However, the UE is unable to determine how many TTIs are needed to receive the specific data from the eNB. As a result, the UE attempts to receive the specific data from the eNB during even a sixth TTI. If the UE does not receive PDCCH or PDSCH data during a corresponding TTI, it is able to decide that the above specific data has been completely received. However, the UE has attempted to receive data of the sixth TTI having no need to be received, resulting unnecessary power consumption occurs in the UE.

In order to allow the UE to receive data, the UE defines a time window (also called a window interval), such that the UE may attempt to receive messages in only the time window. The UE receives information of the window interval from system information. Accordingly, when the UE receives data, it receives the data during a reception (Rx) interval (e.g., 8 TTIs) acting as the window interval. However, in case of using the time window, many more intervals than the requested TTIs must be established due to the above scheduling problem, such that the UE unnecessarily attempts to receive messages, resulting in the occurrence of unnecessary power consumption. For example, although a window value is set to 10 TTIs, the UE completely receives data during 5 TTIs, and then continuously attempts to receive messages during the remaining 5 TTIs other than the above 5 TTIs, resulting in the occurrence of UE's power consumption.

FIG. 6 shows that a transmission interval of specific data is extended due to transmission of higher priority data. If data is transmitted according to eNB's scheduling situations in which transmission environments and radio-resource conditions are reflected, the data may not be transmitted during successive TTIs. As shown in FIG. 6, if 5 TTIs are needed to transmit data from the eNB to an arbitrary UE, transmission of data having priority higher than that of the above data occurs in an (N+2)-th TTI although the eNB actually desires to transmit the above data in the range from an N-th TTI to an (N+4)-th TTI, the eNB may not transmit the above specific data in the (N+2)-th TTI. As a result, the transmission interval of the above data is extended from the N-th TTI to an (N+5)-th TTI. In this case, although the UE is able to receive data using the above-mentioned reception (Rx) method, it should be noted that it may receive unnecessary data as necessary.

In the meantime, a physical downlink control channel (PDCCH) and a physical downlink shared channel (PDSCH) are adapted to transmit paging-associated control information and paging messages. A method for paging at least one UE from the eNB will hereinafter be described in detail.

The term "Paging" is a specific behavior that an eNB searches for one or more UEs to achieve certain purposes. In other words, the term "paging" is a specific function that the eNB pages one or more UEs. This paging function allows the eNB to search for a desired UE from among several UEs, and allows the UE not to be awakened, such that a UE's power-saving consumption results in the implementation of UE's power-saving effect. In other words, the UE is usually in a sleeping mode (also called a sleep mode), but is then woken up upon receiving a paging signal from the eNB such that it conducts commands requested by the eNB.

In order to allow the sleep-mode UE to recognize the above paging signal from the eNB, the sleep-mode UE must be periodically woken up to check the presence or absence of paging information received in the UE itself. The above-mentioned UE's periodic wake-up operation is called a discontinuous reception (DRX), and the LTE system uses this DRX method as a method for receiving UE's paging information.

FIG. 7 shows a variety of paging periods for use in the paging process according to the conventional art. A process for transmitting a paging channel from an eNode-B (eNB) to one or more UEs according to the conventional art is as follows. First, if the UE is registered in the eNB under an idle mode, a paging group is allocated to the UE. The paging group includes a paging indicator (PI). In more detail, if a paging message toward any UE contained in the paging group occurs, the paging indicator (PI) periodically appears in a paging-indication channel. If a specific UE of a CELL_PCH mode from among several connected modes receives the PI, then the specific UE determines the presence or absence of a paging message associated with the specific UE itself.

Under the CELL_PCH mode, the UE can conduct the above-mentioned discontinuous reception to reduce an amount of UE's power consumption. Thus, the eNode-B (eNB) constructs a plurality of paging occasions at intervals of a predetermined time called a paging interval, a specific UE receives only a specific paging occasion selected from among all paging occasions, such that it can acquire a paging message. The above specific UE does not receive data of the paging channel in the remaining paging occasions other than the above-mentioned specific paging occasion. Generally, the paging occasion corresponds to a time interval during which data is transmitted from a Medium Access Control (MAC) end of a wireless protocol structure to a physical end. In case of a UMTS or E-UMTS system, the paging occasion corresponds to a Transmit Time Interval (TTI).

The eNB and the UE indicates whether the paging message appears using a paging indicator (PI) as a specific value for indicating transmission of the paging message. The UMTS system allocates a single bit (i.e., 1 bit) to indicate the PI, such that it indicates whether the paging message appears using the 1 bit. The E-UMTS (Evolved Universal Mobile Telecommunications System) defines a specific identity (e.g., a Paging Indicator-RNTI (PI-RNTI)) to indicate the PI, such that the network is able to inform the UE of paging-information transmission. For example, the UE is woken up at intervals of a discontinuous reception (DRX) period, and receives control information for indicating whether the paging message appears or not. If the received control information includes the PI such as a PI-RNTI, the above UE receives a channel including the above control information and its associated paging message, recovers the received channel, and determines whether its own identifier (i.e., UE identity) exists in the above paging message. If the above paging message includes a UE's identity such as an International Mobile Station Identity (IMSI), the UE answers the network to conduct RRC connection, and then receives a desired service. Also, each paging message may include information of a paging cause to indicate the paging cause. As a result, the individual paging messages can indicate a variety of calling contents, for example, a conversational call, a streaming call, an interactive call, a background call, a high-priority signaling call, and a low-priority signaling call.

As described above, the above-mentioned conventional art does not include specific information indicating whether data to be received in the UE is the last data, such that the UE must attempt to receive unnecessary data, resulting in the occurrence of a large amount of unnecessary power consumption. A paging message for paging a single UE includes the paging-cause information and the UE identity. Thus, if several UEs are simultaneously paged (or simultaneously called) when a cell providing a narrow bandwidth transmits the paging message, the paging message cannot be transmitted during a single paging occasion. So, this paging message can be transmitted after the lapse of the next paging period, resulting in the occurrence of an unexpected paging delay.

DISCLOSURE

Technical Problem

Accordingly, the present invention is directed to a method for transmitting and receiving data in a mobile communication system that substantially obviates one or more problems due to limitations and disadvantages of the related art.

An object of the present invention is to provide a data communication method for use in a mobile communication system.

Another object of the present invention is to provide a data communication method for use in a specific TTI (Transmission Timing Interval) between an eNode-B (eNB) and a user equipment (UE) in a mobile communication system, in which transmission and reception of data Rx-associated information are applied to the above specific TTI.

Another object of the present invention is to provide a method for minimizing an amount of power consumption required for transmitting and receiving data.

Another object of the present invention is to provide a method for transmitting and receiving a plurality of data blocks in a mobile communication system without informing the mobile communication system of a correlation among the data blocks.

Technical Solution

To achieve these objects and other advantages and in accordance with the purpose of the invention, as embodied and broadly described herein, a data transmission method for allowing a transmission end to transmit data to at least one reception end over at least one physical channel in a mobile communication system comprising: transmitting a reception indicator, which indicates whether at least one second physical channel is received, via a first physical channel, such that at least one reception end can determine whether the at least one second physical channel is received using the reception indicator; and transmitting data via a third physical channel controlled by the first physical channel, wherein the first physical channel and the second physical channel are the same physical channels which have different transmission times.

In another aspect of the present invention, there is provided a data reception method for allowing a reception end to receive data in a mobile communication system comprising: receiving a reception indicator, which indicates whether at least one second physical channel is received, over a first physical channel; determining whether the at least one second physical channel is received by referring to the reception indicator; and receiving data via a third physical channel controlled by the first physical channel, wherein the first physical channel and the second physical channel are the same physical channels which have different transmission times.

Advantageous Effects

The data communication method for use in the mobile communication system according to the present invention has the following effects.

First, at least one transmission message can be transmitted via single transmission control information at a specific transmission time.

Second, several paging messages can be received via single paging control information, resulting in the reduction of a service delay.

Third, a sleep time for power saving can be explicitly indicated, such that an amount of power consumption required for transmission and reception of data can be minimized.

Fourth, there is no need to recognize a correlation among a plurality of data units between an eNode-B (eNB) and a user equipment (UE), such that data can be easily communicated between the eNode-B (eNB) and the user equipment (UE).

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

It should be noted that the following embodiments are designed by applying technical characteristics of the present invention to an Evolved Universal Mobile Telecommunications System (E-UMTS) (also called a Long Term Evolution (LTE)). It is obvious to those skilled in the art that the technical characteristics of the present invention can also be applied to other mobile communication systems such as an IEEE 802.16m or a Wibro system without departing from the spirit or scope of the invention.

The E-UMTS system is evolved from a conventional Wideband Code Division Multiple Access (WCDMA) UMTS system, and conducts intensive research into a basic standardization process in the current 3rd Generation Partnership Project (3GPP). Detailed descriptions of technical specifications of the UMTS and E-UMTS have been described in Releases 7, 8 and 9 of "Technical Specification Group Radio Access Network of the 3rd Generation Partnership Project (GPP)".

The following technologies can be applied to not only a multiple-antenna scheme based on multiple antennas but also a variety of communication systems.

Generally, a communication system has been widely used to provide a variety of communication services (e.g., VoIP or packet data). The above-mentioned communication system has been used for a downlink or an uplink. The downlink is indicative of a communication from an eNode-B (eNB) to a user equipment (UE). The uplink is indicative of a communication from the UE to the eNode-B (eNB). The eNode-B (eNB) is indicative of a fixed point communicating with the UE, and includes a network other than the UE in a communication system including not only a physical transmission end but also an upper layer. The network and the eNode-B (eNB) are symmetrical to the user equipment (UE), and it should be noted that the network has the same meaning as the eNode-B (eNB). The user equipment (UE) may be fixed or have mobility. The present invention may be applied to a single-carrier communication system or a multi-carrier communication system. The multi-carrier system may use an orthogonal frequency division multiplexing (OFDM) scheme or other multi-carrier modulation schemes.

Figure 1:
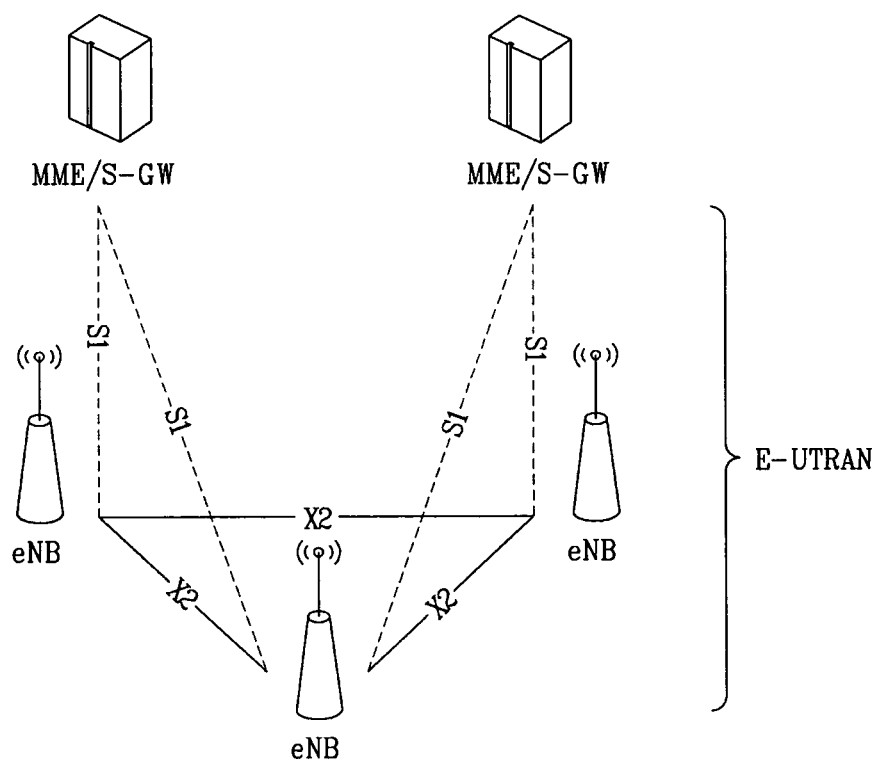
FIG. 1 is a structural diagram illustrating a network structure of an Evolved Universal Mobile Telecommunication System (E-UMTS) acting as a fourth-generation mobile communication system.
Figure 2:
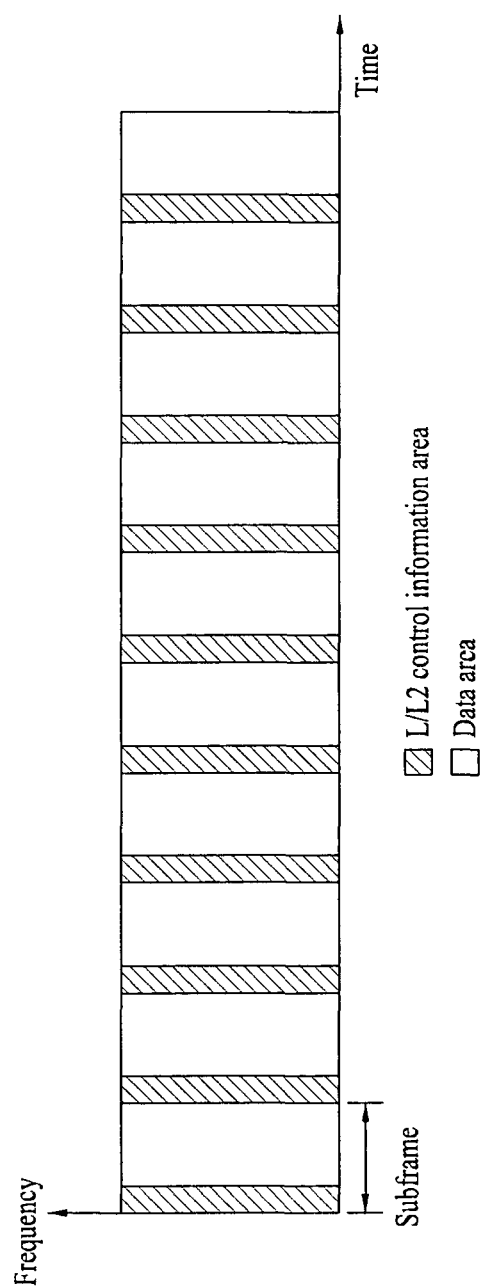
FIG. 2 is a conceptual diagram illustrating a physical channel structure for use in an E-UMTS system.
Figure 3:
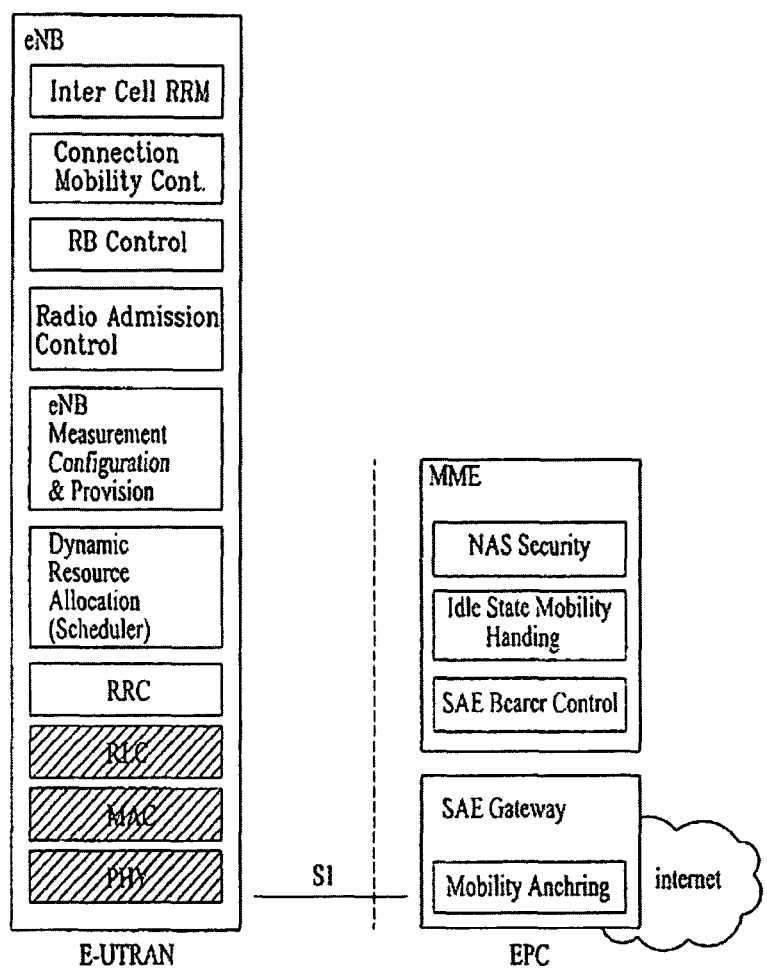
FIG. 3 is a conceptual diagram illustrating an Evolved Universal Terrestrial Radio Access Network (E-UTRAN)
Figure 4A:
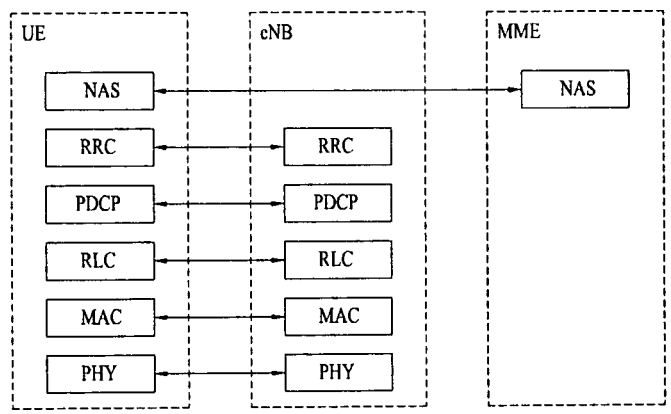
FIG. 4A shows a control plane protocol structure contained in a radio interface structure between a user equipment (UE) and an E-UTRAN.
Figure 4B:
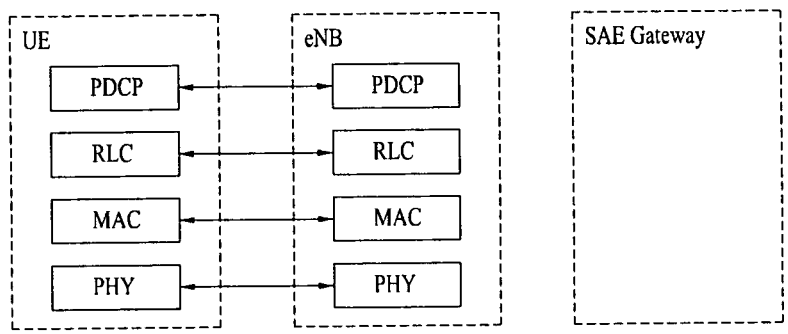
FIG. 4B shows a user plane protocol structure contained in a radio interface structure between a UE and an E-UTRAN.
Figure 5:
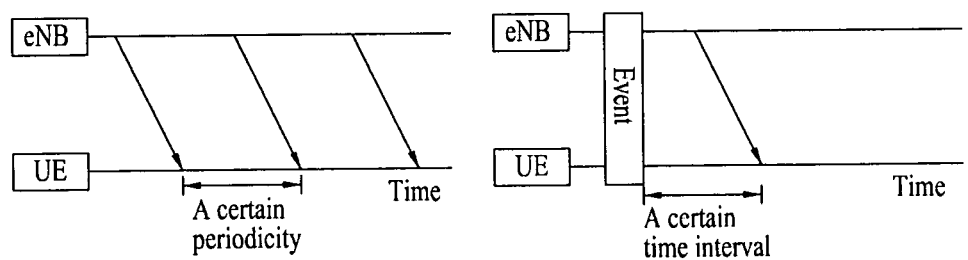
FIG. 5 shows exemplary methods for transmitting data from an eNode-B (eNB) to a user equipment (UE)
Figure 6:
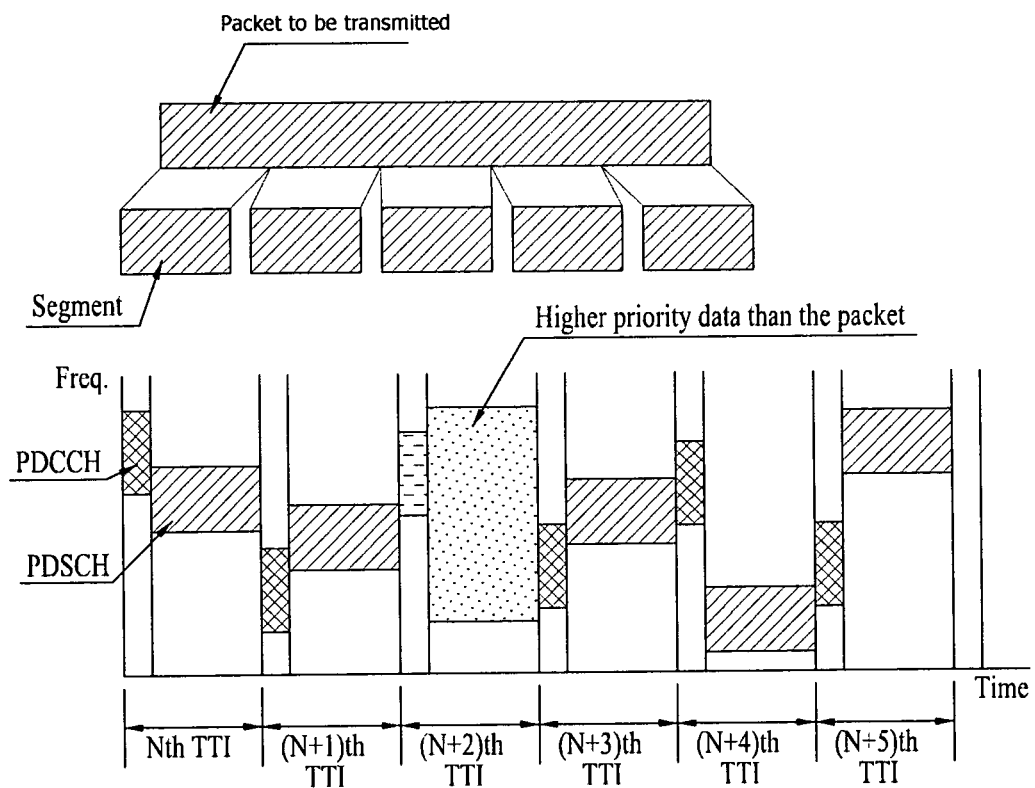
FIG. 6 shows that a transmission interval of specific data is extended due to transmission of higher priority data.
Figure 7:
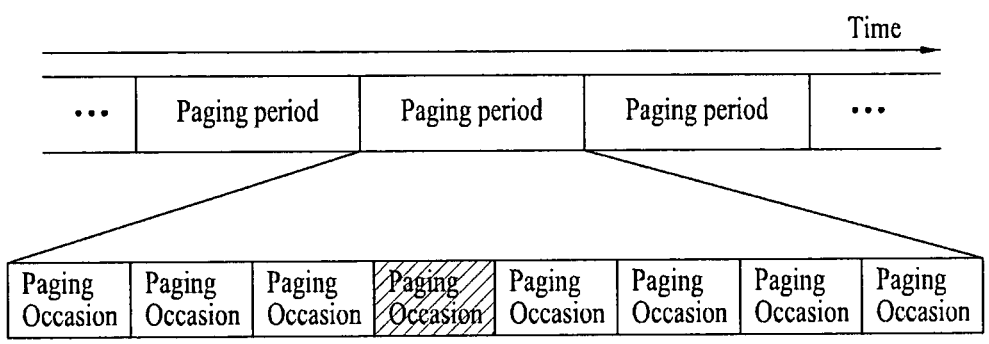
FIG. 7 shows a variety of paging periods for use in a paging process according to the conventional art.
Figure 8:
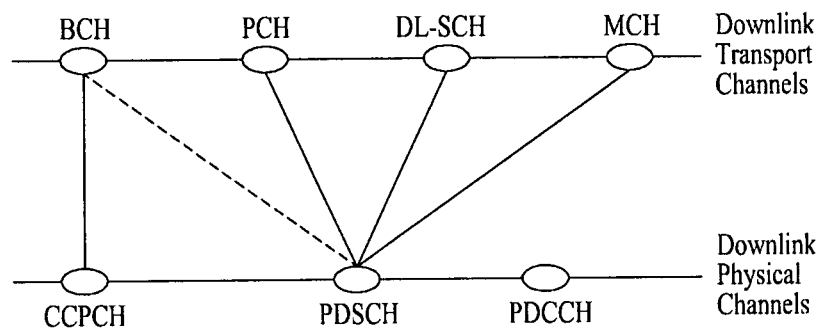
FIG. 8 is a conceptual diagram illustrating a mapping relationship between a transport channel and a physical channel of an E-UTRAN system according to the present invention.

FIG. 8 is a conceptual diagram illustrating a mapping relationship between each transport channel and each physical channel of an E-UTRAN system according to the present invention. Referring to FIG. 8, a plurality of transport channels may be assigned to a PDSCH acting as a physical channel. For example, the above-mentioned transport channels of FIG. 8 may be a broadcast channel (BCH) for system information, a paging channel (PCH) for a paging message, a DL-SCH acting as a transport channel for a downlink shared channel, and an MCH channel acting as a transport channel for a multicast channel. A random access response generated from the MAC layer and a message transmitted from an eNode-B (eNB) in a wake-up or interval (or an on-duration) of a discontinuous reception (DRX) operation use the DL-SCH as their transport channel, such that they are assigned to the PDSCH acting as a physical channel. In FIG. 8, the BCH denoted by dotted lines in the mapping relationship between each transport channel and each physical channel may also be assigned to either a PDSCH or a common control physical channel (CCPCH) used for the conventional UMTS system.

As described above, in order to allow a user equipment (UE) to receive data transmitted to the PDSCH, the UE must pre-recognize specific information indicating how to receive and decode PDSCH data. In more detail, the UE is able to pre-recognize the above specific information over the PDCCH. In a single subframe of an OFDM-based system, a PDCCH is located at a time earlier than that of a PDSCH, and then the PDSCH is located behind the PDCCH, such that the above-mentioned OFDM-based system acquires information needed for receiving PDSCH data over the PDCCH.

In accordance with a method for allowing a reception end such as a UE in a mobile communication system according to the present invention, the method includes receiving a first physical channel equipped with a reception indicator indicating at least one of a follow-up indicator function and the last indicator function. The follow-up indicator function represents whether the UE needs to receive specific data of a specific TTI from the eNode-B (eNB), i.e., the follow-up indicator indicates an offset position. Also, the follow-up indicator function represents whether the UE must continuously receive specific data until reaching a specific TTI, i.e., the follow-up indicator function indicates continuous reception. The last indicator function represents whether specific data acquired from a current TTI or some follow-up TTIs is the last data or represents whether specific data indicates transmission of the last segment of corresponding data.

The transmission timing interval (TTI) may be indicative of a minimum transmission unit for a mobile communication system, or may be used as a transmission unit (e.g., a sub-frame or a slot) decided by a system administrator.

The above reception indicator may be comprised of at least one bit, and it should be noted that this configuration of the reception indicator may be variable with system setup environments. According to usages of the above-mentioned reception indicator, the UE is able to indicate a variety of information. For example, the UE is able to indicate whether the UE needs to receive specific data from the eNode-B (eNB) after the lapse of two TTIs starting from a current TTI, is able to indicate whether the UE must continuously receive specific data until reaching a specific TTI, is able to indicate whether specific data acquired from a current TTI or two TTIs located behind the current TTI corresponds to either the last data to be received in the UE or transmission of the last segment of corresponding data.

The above UE decides whether to receive specific data in the follow-up TTI according to the type (i.e., the follow-up indicator or the last indicator) of the reception indicator, and receives one or more second physical channels including another reception indicator which indicates whether to receive the specific data after the lapse of a TTI associated with the specific data to be received.

Also, the UE receives a first physical channel, and is able to receive specific data associated with control information contained in the first physical channel over a third physical channel controlled by the first physical channel. The above-mentioned control information (hereinafter referred to as L1/L2 (Layer1/Layer2) control information) is transmitted to a L1/L2 control channel. The L1/L2 control information may further include a transport format of a resource block used for data transmission, subcarriers, symbol information, Adaptive Modulation Coding (AMC) information, HARQ information, and paging control information including a paging indicator (PI) and a PI-RNTI used to indicate the presence or absence of a paging message.

The channel for transmitting the above-mentioned L1/L2 control information may be a physical downlink control channel (PDCCH) or a physical uplink control channel (PUCCH). If the L1/L2 control information is transmitted via a data area, the above channel for transmitting the L1/L2 control information may be a physical downlink shared channel (PDSCH), a paging channel (PCH), a downlink-shared channel (DL-SCH), a physical uplink shared channel (PUSCH), or an UL-SCH. In more detail, the PDCCH may include paging control information associated with the UE, control information associated with system information reception, and another control information associated with specific data transmission. Also, a PDSCH, a PCH, a DL-SCH, a PUSCH, a UL-SCH, etc., may be used as a transport channel for transmitting the above data.

The L1/L2 control information including the above-mentioned reception indicator may also be transmitted to a reception end through a RRC signal. The RRC signal may relate to system information, Radio Bearer Setup, Radio Bearer Reconfiguration, RRC Connection Request/Connection Setup/Connection Release, RRC Connection Reconfiguration, RRC Connection Re-establishment, etc.

In case of transmitting the L1/L2 control information, including the above reception indicator and/or specific information required for successively receiving data blocks, to the reception end, the L1/L2 control information may be transmitted via the RRC signal, and may also be transmitted to PDUs of PDCP (Packet Data Convergence Protocol)-, RLC (Radio Link Control)-, and MAC (Medium Access Control)- layers.

Data contained in the above data block can also be transmitted to the reception end via the RRC signal. Also, the above data may be transmitted via the RRC signal, and may be PDUs of the PDCP, RLC, and MAC layers.

PDCCH may include a first RNTI used for receiving system information, a second RNTI used for receiving paging information, and a third RNTI used for receiving a random access response. The first RNTI used for receiving the system information includes a System Information-RNTI (SI-RNTI), a BCCH-RNTI, a Scheduling Unit-RNTI (SU-RNTI), etc. The second RNTI used for receiving the paging information includes a Paging-RNTI (P-RNTI), a PCCH-RNTI, a Paging Indicator-RNTI (PI-RNTI), etc. The third RNTI used for receiving the random access response includes a Random Access-RNTI (RA-RNTI), a Cell-RNTI (C-RNTI), etc.

Specific data contained in the PDSCH is data information associated with the above-mentioned PDCCH, and may include at least one of a UE-associated paging message, system information generated from the RRC layer, data transmission information, a random access response generated from the MAC layer, a message transmitted from an eNode-B in the wake-up interval contained in the DRX operation, and user data such as a dedicated data message for the UE. Otherwise, the specific data may be a reception indicator or control information contained in a physical downlink control channel (PDCCH).

A second physical channel and a first physical channel may be the same physical channels at different transmission times. More specifically, the second physical channel may be indicative of a physical downlink control channel (PDCCH) contained in a subframe of a TTI located behind a subframe including the first and third physical channels. It is determined that the reception indicator contained in the first physical channel indicates how many second physical channels will be received, or it is determined which one of TTIs indicates reception of the second physical channels. In consideration of the determined result, the UE decides a subframe to be received and a physical downlink control channel (PDCCH) contained in the decided subframe. One embodiment of the present invention will hereinafter be described from the viewpoint of a downlink for transmitting the reception indicator from the eNode-B (eNB) to one or more UEs.

The eNode-B (eNB) can transmit control information including at least one of data transmission interval information (at time and/or frequency viewpoints) and data transmission method information at a time earlier than that of the first physical channel including the above reception indicator, such that the eNode-B (eNB) can allow at least one UE to receive specific data using system information. The above-mentioned transmission method information may include a variety of information, i.e., information indicating whether a current transmission method is a continuous TTI reception mode or a reception window mode, the length of the continuous TTI reception mode, and the length of the reception window. Also, control information indicating whether the reception indicator is the follow-up indicator (including the offset indicator and the continuous reception indicator) or the last indicator can be transmitted at a time earlier than that of the first physical channel.

Thereafter, the eNode-B (eNB) determines whether it must transmit specific data to the at least one UE in a specific TTI, and transmits a first physical channel equipped with a reception indicator to the at least one UE. In this case, the reception indicator contained in the first physical channel indicates whether specific data is received in a specific TTI. As described above, the specific data may be control information loaded on the physical downlink control channel (PDCCH), or may be user data loaded on the physical downlink shared channel (PDSCH).

In the OFDM mobile communication system, a subframe of 1 ms is used as a basic transmission unit, and a single subframe includes a physical downlink control channel (PDCCH) and a physical downlink shared channel (PDSCH), as previously stated above. In this embodiment of the present invention, for the convenience of description and better understanding of the present invention, a physical downlink control channel (PDCCH) of a subframe at a specific transmission time is defined as a first physical channel, and a physical downlink shared channel at another transmission time (e.g., TTI) located behind the above specific transmission time is defined as a third physical channel. The eNode-B (eNB) simultaneously transmits the first and third physical channels. The UE receiving the first and third physical channels is able to receive data of the third physical channel using control information associated with the third physical channel contained in the first physical channel.

Also, according to information of the reception indicator contained in the first physical channel, the eNode-B (eNB) decides whether to transmit the subframe to at least one UE associated with the reception indicator at the next transmission time. The physical downlink control channel of the subframe at the next transmission time is called a second physical channel. The second physical channel also determines whether the subframe is transmitted to the at least one UE at the next transmission time. In other words, the first physical channel and the second physical channel are used as physical channels capable of transmitting homogeneous information, but their homogeneous information is transmitted at different TTIs.

In this case, a physical downlink shared channel (PDSCH) including the above third physical channel is controlled by the above first physical channel, such that the at least one UE having received the third physical channel determines whether to use the PDSCH associated with inner information of the first physical channel, and also determines a method for using the PDSCH by referring to the same inner information of the first physical channel.

The reception indicator is comprised of one or more bits as described above, such that specific information, indicating whether the subframe is transmitted after the lapse of one or more TTIs, can be provided to at least one UE associated with the above reception indicator. For example, if the reception indicator is comprised of 3 bits, this reception indicator can indicate whether the subframe associated with the at least one UE is transmitted in the range from a current TTI to the next 7 TTIs located behind the current TTI. In other words, if a decimal value of the above reception indicator is 5, according to initial configuration information between the eNB and the UE, the eNB may indicate that a subframe including a PDSCH, which should be received in the UE, is transmitted after the lapse of a fifth TTI located behind the current TTI, or may indicate that the UE must receive subframes in the range from a current TTI to a fifth TTI located behind the current TTI.

Needless to say, a PDCCH contained in the received subframe may also include the reception indicator indicating whether the subframe is additionally received after the lapse of the subframe's reception (Rx) time. Therefore, the UE continuously receives the subframe until the value of the reception indicator applied to the UE itself indicates no more reception status. On the other hand, until the eNB self-generates the other reception indicator indicating no more subframes to be transmitted to the UE, or receives the above-mentioned reception indicator from an upper layer, the eNB transmits another subframe equipped with a PDCCH including the reception indicator in the range from a current time to a specific TTI or may also transmit the another subframe at the specific TTI.

As described above, the physical downlink control channel (PDCCH) such as the first or second physical channel includes the reception indicator. Besides, the above-mentioned PDCCH may further include at least one of paging control information of the at least one UE, system information reception control information, and data transmission control information. The paging control information indicates the presence or absence of a paging message associated with the at least one reception end. The system information reception control information relates to system information transmitted from the eNode-B (eNB) to the UE. The data transmission control information relates to either a transmission format of data contained in the PDSCH such as the third physical channel or a reception method of the above data. Data contained in the third physical channel includes at least one of the reception indicator, the paging message associated with the at least one reception end, system information, data transmission information, and user data.

If the reception indicator serves as the last indicator, a method for transmitting and receiving data in a mobile communication system according to another embodiment of the present invention will hereinafter be described in detail. The UE receives a first physical channel equipped with the reception indicator acting as the last indicator from the eNB, and determines whether data is received according to the first physical channel. In this case, data may indicate the above second physical channel, or may be the above specific data transmitted over the second or third physical channel.

In order to enable the UE to receive specific data from the eNB, the UE may receive the control information including at least one of specific-data transmission interval information and specific-data transmission method information at a specific time earlier than that of the first physical channel through the system information, etc.

The reception indicator acting as the last indicator according to one embodiment of the present invention is a minimum of 1-bit information. If the 1-bit last indicator received in the UE is "1", the UE determines that there is no specific data associated with the UE itself in the range from the next TTI of the above TTI having received the last indicator. The UE does not attempt to receive the specific data until receiving a re-reception indication message (i.e., a re-reception command) in the range from the follow-up TTI to the reception window interval or in the wake-up interval of the DRX cycle. The size of the above reception window can be pre-recognized by the UE through the system information. If the 1-bit last indicator received in the UE is "0", the UE must continuously receive specific data even in the following TTIs, such that it is able to receive PDCCH and PDSCH data. In other words, the UE must attempt to receive the PDCCH and PDSCH data even in the DRX cycle.

Likewise, if the last indicator is comprised of at least 2 bits, the range to the extent of a maximum allowable range representable by the at least 2 bits can be used as a reception range. For example, in the case where the last indicator is comprised of 2 bits and the received n-th last indicator is "0", this means a continuous reception indication. In the case where the last indicator is comprised of 2 bits and the received n-th last indicator is "1", this means a reception stop status in the range from the next TTI (i.e., in the range from the (n+1)-th TTI). In the case where the last indicator is comprised of 2 bits and the received n-th last indicator is "2", this means a reception stop status in the range from the (n+2)-th TTI. In the case where the last indicator is comprised of 2 bits and the received n-th last indicator is "3", this means a reception stop status in the range from the (n+2)-th TTI. Although the last indicator is comprised of at least 3 bits, the above-mentioned operations may also be applied to the other last indicator comprised of at least 3 bits in the same manner as in the last indicator comprised of at least 2 bits.

As described above, the last indicator can be transmitted as a MAC control element transferred over the PDCCH and the PDSCH. The MAC control element includes the last indicator of at least 1 bit in the same manner as in the above-mentioned PDCCH, such that it indicates whether specific data is received after the lapse of a received TTI.

As described above, the PDCCH may include a variety of RNTI information. By means of RNTI information, the UE is able to recognize a PDCCH for the specific data or a PDCCH for UE-dedicated data. In other words, the UE decides whether a current RNTI is a SI-RNTI, a P-RNTI, a RA-RNTI, or a C-RNTI by means of the RNTI checking process such as a CRC checking process, such that it is able to confirm a PDCCH usage.

Figure 9:
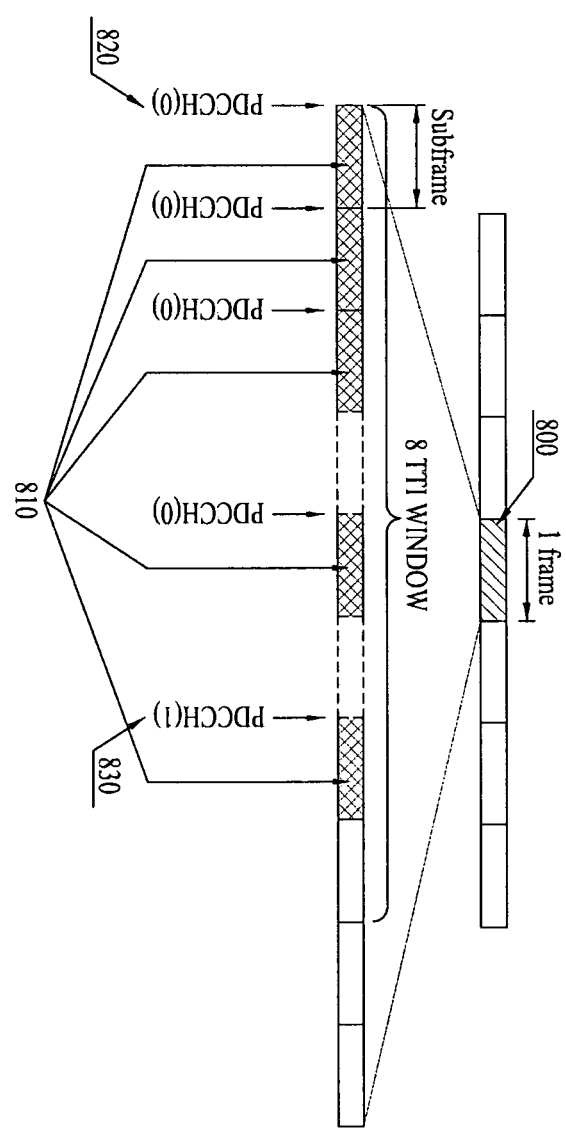
FIG. 9 is a conceptual diagram illustrating a method for enabling a user equipment (UE) to receive system information contained in specific data from an eNode-B (eNB) according to one embodiment of the present invention.

FIG. 9 is a conceptual diagram illustrating a method for enabling the UE to receive system information contained in specific data from an eNode-B (eNB) according to one embodiment of the present invention. In order to systematically transmit system information, the RRC layer groups system information having similar characteristics into a single bundle, such that it configures System Information Block (SIB) using the single bundle. System information contained in different SIBs has not only different contents but also different transmission characteristics. Substantial system information is contained in the SIB. Scheduling information for transmitting the SIB is loaded on a Master Information Block (MIB) or a Scheduling Unit (SU).

System information transmitted from an eNB to a UE can be transmitted to the UE according to two transmission formats (i.e., two transmission methods). In the first transmission method, the MIB contained in the system information may be transmitted over a BCH acting as a transport channel, and an SU (SU-1~SU-N) acting as another system information (SI) may be transmitted over a DL-SCH acting as a transport channel. The above SUs are properly scheduled according to the period, such that the scheduled results are transmitted to the UEs. Period information of each SU or another period information associated with a specific SU group is contained in a scheduling block (SB) contained in the SU-1. For example, provided that a transmission period associated with the SU-2 is set to 120 ms in the SU-1, and the transmission period of 120 ms is transmitted in the range from a minimum of 5 TTIs to a maximum of 8 TTIs due to the bit size of SU-2 information, the UE acquires the SU-2's period according to SB information contained in the SU-1, and attempts to receive the SU-2 in the range from 5 TTIs to 8 TTIs at intervals of 120 ms.

As shown in FIG. 9, provided that the reception time window is set to 8 TTIs and a current mode is a discontinuous TTI reception mode, a method for allowing the UE to receive system information according to one embodiment of the present invention will hereinafter be described in detail. This embodiment assumes that the size of the reception indicator is a single bit (i.e., 1 bit) and the reception indicator is transmitted to the PDCCH.

The SU-1 may include not only specific information indicating which one of window schemes will be used to receive system information, but also another information indicating whether a continuous TTI will be used. The UE attempts to receive the SU-2 (800) in the specific TTI. If the above UE receives no data prior to the reception interval of the SU-2, the DRX mode (in which data is discontinuously received to reduce an amount of UE's power consumption) may be established in the UE. In other words, the UE is woken up from the DRX mode to receive the SU-2 (800) according to the SB's information.

It is assumed that the SU-2 (800) is divided into 5 segments (810) corresponding to double-hatched blocks of FIG. 9 according to the number of bits and channel situations of information, such that the 5 segments (810) are transmitted during the 5 TTIs. If the eNode-B (eNB) transmits the SU-2 segment, the PDCCH may include one bit (i.e., 1 bit) indicating whether the last data or the last segment of corresponding data is transmitted at a current TTI, such that the resultant PDCCH is transmitted. The SU-2's segment is transmitted at a first TTI, such that the last indicator of "0" (820) is established in the PDCCH. In the following embodiments, 'PDCCH(0)' indicates that the last indicator of a corresponding PDCCH is '0', and 'PDCCH(1)' indicates that the last indicator of a corresponding PDCCH is '1'.

In other words, the UE attempts to receive data of PDCCH at the next TTI. In the case where the UE may not receive the PDCCH data before the above value '1' is established, it attempts to receive again the PDCCH data at the next TTI. Provided that the eNB transmits the last segment of the SU-2 (800), if the reception indicator, indicating whether either the last data or the last segment of corresponding data is transmitted at a current TTI, is set to '1' as denoted by (830), the UE does not attempt to receive the PDCCH at the next TTI, and at the same time can directly enter the DRX mode at the next TTI.

Figure 10:
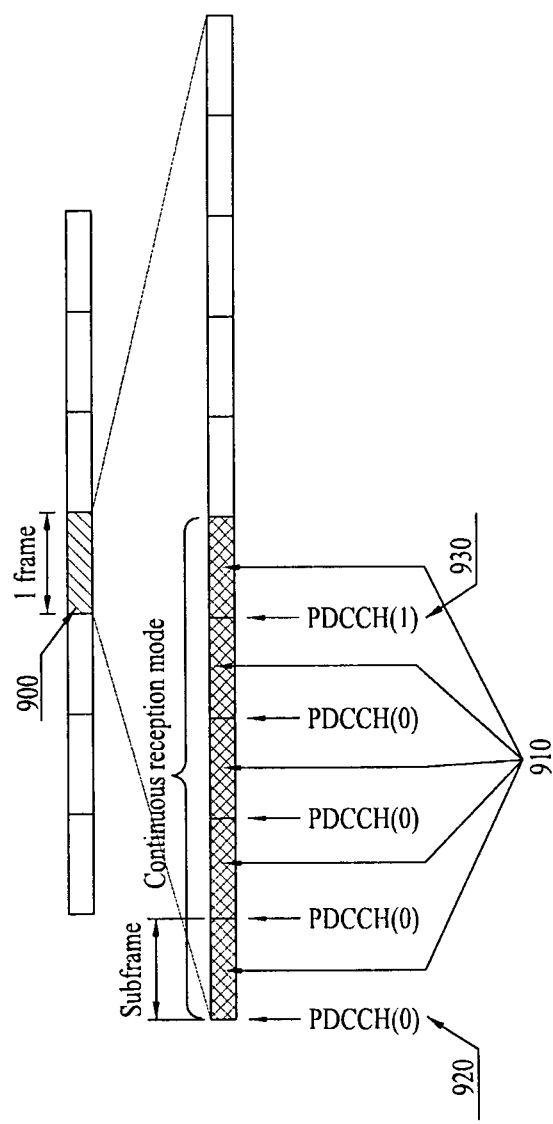
FIG. 10 a conceptual diagram illustrating a method for enabling a user equipment (UE) to receive system information contained in specific data from an eNode-B (eNB) according to another embodiment of the present invention.

FIG. 10 is a conceptual diagram illustrating a method for enabling the UE to receive system information contained in specific data from the eNB according to another embodiment of the present invention.

Referring to FIG. 10, if transmission of system information generated from the eNB must use successive TTIs, a method for allowing the UE to receive system information according to the present invention is as follows. In this case, the UE's operation process is equal to a reception process based on the above window scheme, the size of the reception indicator is 1 bit and the reception indicator of 1 bit is transmitted over the PDCCH.

The UE attempts to receive the SU-2 (900) at a specific interval according to the SU-1's SB information. If the UE does not receive specified data prior to the reception interval of the SU-2 (900), it may enter the DRX mode. In other words, the UE is woken up from the DRX mode, such that it receives the SU-2 (900) according to the SB information.

It is assumed that the SU-2 (900) is divided into 5 segments 910 corresponding to double-hatched blocks of FIG. 10 according to the number of bits and channel situations of information, such that the 5 segments 910 are transmitted during the 5 TTIs. If the eNode-B (eNB) transmits the SU-2 segment, the PDCCH may include one bit (i.e., 1 bit) indicating whether the last data or the last segment of corresponding data is transmitted at a current TTI, such that the resultant PDCCH is transmitted. The SU-2's segment is transmitted at a first TTI, such that the last indicator of "0" (920) is established in the PDCCH. In other words, the UE attempts to receive the PDCCH at the next TTI. Otherwise, if the UE does not receive the PDCCH until the reception indicator is set to '1', the UE attempts to receive the PDCCH at the next TTI.

Provided that the eNB transmits the last segment of the SU-2 (900), if reception indicator, indicating whether either the last data or the last segment of corresponding data is transmitted at a current TTI, is set to '1' as denoted by 930, the UE does not attempt to receive the PDCCH at the next TTI, and at the same time can directly enter the DRX mode at the next TTI.

A method for allowing the UE to receive a paging message used as a specific data from the eNB according to another embodiment of the present invention will hereinafter be described. According to the number of paged UEs, a channel situation, and a bandwidth supported by the cell, a TTI required for transmitting the paging message may be variable. For example, provided that the paging actions for 5 UEs are requested in the same TTI, and a maximum amount of transmittable radio resources at a corresponding TTI can include only paging messages of three UEs, the eNB is able to transmit the paging messages of the remaining two UEs at the next TTI. However, the above-mentioned UEs cannot recognize how many TTIs are needed to transmit their own paging messages. Therefore, if the paging messages will be transmitted at continuous TTIs, each of the above UEs must attempt to receive the PDCCH such that it can determine the presence or absence of transmission of the additional paging message.

However, in the above-mentioned example, if the paging messages for the 5 UEs can all be transmitted during a single TTI, there is no need to transmit more paging messages at the next TTI. However, in fact, the above UEs are unable to determine whether their paging messages are transmitted at the next TTI, such that they unnecessarily attempt to receive the PDCCH or the PDSCH, resulting in the occurrence of unnecessary power consumption.

Therefore, according to this embodiment of the present invention, a specific TTI in which the UE attempting to receive the paging message receives the PDCCH at a specific paging occasion is used as a TTI for transmitting the last paging message. So, if a current TTI is shifted to the next TTI, the eNB includes specific indication information in the PDCCH equipped with the P-RNTI, and transmits the resultant PDCCH including the above indication information. In this case, the specific indication message indicates that the UE need not attempt to receive the paging message.

Therefore, according to the above-mentioned indication information contained in the PDCCH, the UE is able to determine whether it will attempt to receive the paging message at the next TTI behind a current TTI where the PDCCH is received. Therefore, if it is determined that there is no need for the UE to receive the paging message at the next TTI, the UE enters the DRX mode to prevent unnecessary power consumption.

Next, in the case where the UE receives a random access response contained in specific data received from the eNB according to another embodiment of the present invention, the following operations will be carried out. Detailed description thereof will hereinafter be described in detail. The UE performs a random access process, such that it transmits an access request to the eNB, is handed over to the eNB, and requests radio resources from the eNB.

In the random access process, the UE transmits a random access preamble to the eNB using specific information received from the eNB, and then the eNB transmits a random access response to the UE in response to the random access preamble. The random access response is transmitted to a PDSCH (acting as a physical channel) over a DL-SCH acting as a transport channel, such that a PDCCH is also transmitted from the eNB to the UE.

In order to minimize the interference among different users or different cells, the above UE transmits the random access preamble at a specific power established by the eNB. If the eNB has not normally received the random access preamble due to a low power level, the eNB is unable to transmit the random access response to the UE, such that the UE is also unable to receive its own random access response in the range of a predetermined reception time window. In this case, the UE continuously attempts to receive a PDCCH and a PDSCH within the above reception time window. If the UE has not received the PDCCH and the PDSCH within the above reception time window, the power level of the random access preamble gradually increases, such that the random access process is re-performed at the increased power level. Next, the reception time window will hereinafter be described in detail.

In association with operations of the UE receiving the random access response, a specific time window can be established to receive the UE's random access response (e.g., system information or a paging message). In other words, the UE transmits the random access preamble. After the lapse of a predetermined time behind the transmission time of the above random access preamble, the UE may attempt to receive the above response information during a specific reception time window.

For example, in the case where the reception time window is set to two TTIs (i.e., 2 TTIs) and the eNB transmits random access response information after the lapse of 5 TTIs after the UE has transmitted the random access preamble, if the UE transmits the random access preamble at the N-th TTI, the UE attempts to receive a PDCCH and a PDSCH in the range from the (N+5)-th TTI to the (N+6)-th TTI (i.e., in the range of a reception time window composed of 2 TTIs), such that it is able to receive the random access response in the reception time window composed of 2 TTIs.

In this case, the random access response includes a response to the transmitted random access preamble, and at the same time can be transmitted over a single DL-SCH, such that the random access response message may have a variety of sizes as necessary. For example, provided that the reception time window interval is 2 TTIs and transmission of random access response information of 5 UEs is needed, if it is determined that the random access response information of only three UEs can be transmitted at a single TTI, the eNB transmits random access response information for the above three UEs at a first TTI (i.e., an initial TTI), and transmits random access response information for the remaining 2 UEs at a second TTI (i.e., the next TTI).

However, the UE which must receive random access response information is unable to recognize which one of TTIs contained in the reception time window will be used to transmit the random access response information, such that the UE must continuously attempt to receive a PDCCH and a PDSCH until the reception time window expires. For example, provided that the eNB is able to transmit three random access response information at a first TTI on the condition that it must transmit the three random access response information during the reception time window composed of 2 TTIs, the UE attempts to receive the PDCCH and the PDSCH even at a second TTI although the eNB does not transmit the random access response information at the second TTI.

According to still another embodiment of the present invention, a PDCCH equipped with a RNTI used for transmitting random access response information includes a reception indicator equipped with the last indicator function. In more detail, this reception indicator acting as the last indicator function indicates whether the above random access response information is the last transmission data at a corresponding TTI, or indicates whether the above random access response information will be transmitted even at the next TTI. Therefore, based on the reception indicator applied to the PDCCH, the UE determines whether it will attempt to receive the PDCCH and PDSCH used for receiving the random access response information at the next TTI contained in the reception time window.

As described above, if it is assumed that the random access preamble is not normally transmitted due to a low power level of the UE, and the UE receives the reception indicator indicating that the random access response would not be transmitted to a PDCCH at the next TTI before the reception time window expires, the UE immediately re-attempts to perform the random access process.

Next, in the case where the UE receives an MCCH used for receiving a MBMS service contained in specific data received from the eNB according to still another embodiment of the present invention, the following operations will be carried out. Detailed description thereof will hereinafter be described in detail. The MCCH acting as a logical channel provides information required when the UE receives the MBMS service. The MCCH may be mapped to a DL-SCH or an MCH. If the MCCH is mapped to the DL-SCH, the eNB may transmit a PDCCH including an MCCH RNTI used for transmitting the MCCH channel to the UE.

Also, the MCCH channel may include periodically-changeable information therein. In other words, the UE is able to receive the MCCH channel only when corresponding information is shifted to the MCCH channel. The MCCH channel can be transmitted from the eNB within the reception time window as previously stated. According to this embodiment of the present invention, a PDCCH including the MCCH RNTI may further include the reception indicator acting as the last indicator, such that the reception indicator used as the last indicator indicates whether the MCCH transmission is completed at a current TTI, or indicates whether the MCCH will be transmitted at the next TTI of the reception time window. As a result, the UE refers to the reception indicator contained in the PDCCH, such that it may determine whether it must receive the MCCH at the next TTI contained in the time window, or may determine whether it must immediately perform the DRX operation without receiving the MCCH at the above next TTI contained in the time window.

Next, in the case where the UE receives dedicated data from the eNB according to still another embodiment of the present invention, the following operations will be carried out. Detailed descriptions thereof will hereinafter be described in detail. Differently from the previously-stated embodiments, according to this embodiment, although the eNB transmits dedicated data to the UE, the dedicated data can be transmitted by a PDSCH used as a physical channel through the medium of the DL-SCH used as a transport channel. In this case, in order to allow the UE to receive the PDSCH, transmission of the PDCCH is firstly requested in the same manner as in the previously-stated embodiments. While the UE connects to the eNB, this PDCCH can be CRC-masked with a cell-RNTI (C-RNTI) indicating UE's unique identification information. The UE predetermines whether to use the window scheme as a reception scheme by referring to system information, or predetermines whether to use the continuous-TTI scheme by referring to such system information, such that it determines the presence or absence of PDSCH data to be received in the next reception time interval according to the reception indicator information contained in the received PDCCH. The above-mentioned embodiments have disclosed exemplary cases for the reception indicator used as the last indicator.

Next, if the reception indicator is used as the follow-up indicator, a method for transmitting and receiving data in a mobile communication system according to another embodiment of the present invention will hereinafter be described in detail.

When a transmission end transmits data contained in a data transmission area (e.g., PDSCH) through the medium of control information of a control information transmission area (e.g., PDCCH) contained in a data block such as a subframe, a data communication method according to still another embodiment of the present invention allows a reception end to decide whether to receive data contained in a corresponding data block by referring to the control information.

Also, the reception end may continuously receive control information or data of the next data block through the medium of indication information indicating whether the follow-up data contained in the control information is received or not, or may receive control information or data of the other data block generated after the lapse of a predetermined number of TTIs, or may determine whether to receive control information or data of a data block in the range from the control information transmission area of a current data block to a predetermined interval. Furthermore, the transmission end may transmit specific control information to the reception end, in which the specific control information indicates whether a function required for receiving several data blocks is supported or not.

The above-mentioned distinction information decided by reception or non-reception of the follow-up data may be implicitly decided between the eNB and the UE. By means of the above distinction information, the UE may decide whether to receive a data block generated after the lapse of a predetermined time interval, or may decide whether to receive the other data block including control information of the data block reaching the predetermined time interval. On the other hand, the above-mentioned distinction information may be explicitly decided by either of the transmission end and the reception end, such that the decided distinction information may be applied to the other one other than the decided end. Also, the specific control information indicating whether the above-mentioned function for receiving several data blocks is supported is used as basic information required for allowing a cell to receive necessary services, and may be provided to the UE through system information.

The reception indicator having the follow-up indicator function for indicating whether the follow-up data is received may include at least one bit. If the reception indicator indicates a non-reception status, the reception end does not receive the next data block. If the reception indicator indicates a reception status, the reception end can receive several data blocks from an initial data block corresponding to a specified value in the former case, or can continuously receive data blocks to the extent of the data block corresponding to the specified value in the latter case. In the above latter case, the transmission end may not include the above indication information, indicating whether the follow-up data is received, in the control information areas contained in data blocks to the extent of the specific data block. The above-mentioned reception indicator having the follow-up indicator function may also be called chain information (CI) as necessary.

The above-mentioned reception indicator may enter the sleep mode to reduce an amount of power consumption while data blocks are not received. So, the reception indicator used as the chain information (CI) may also be called a sleeping indicator.

Next, if the reception indicator used as the follow-up indicator is applied to the paging procedure, the following operations will be carried out. Detailed descriptions thereof will hereinafter be described in detail.

Generally, the DRX mode is used to increase a standby- or waiting-time of the UE which is mainly in the idle mode. In other words, during the DRX mode, the UE is woken up at a predetermined time for the paging function, monitors predetermined channels for a predetermined period of time, and enters the sleep mode in such a way that the wake-up operation, the monitoring operation, and the sleep-mode entering operation are repeated in the DRX mode. Also, although the UE connects to the eNB, it may enter the DRX mode at intervals of a resource-allocation period received from the eNB, in which the resource-allocation period is decided by the eNB in consideration of a service type or the level of a UE's resource request.

For the above-mentioned purposes, the UE and the eNB agree to make a DRX configuration, such that their sleep periods and their active periods are repeated according to the DRX configuration. The sleep period is a predetermined interval in which the UE powers off the receiver such that an amount of power consumption is minimized. The active period is a predetermined interval in which the UE powers off the receiver such that it performs normal reception operations. This active period may also be called a Wake-Up period. The DRX operations can be carried out when the UE and the eNB recognize the DRX cycle, etc. The DRX cycle includes an active period and a sleep period. The longer the DRX cycle, the longer the speed period. As a result, the longer the DRX cycle, the less the amount of UE's power consumption. However, the increasing DRX cycle unavoidably increases a UE's paging delay. The DRX cycle information is signaling-processed by the network. The length of the active period indicates the length of a UE's wake-up period caused by a single active period. Generally, a predetermined value is used as the length of the active period.

An inner area of a single DRX cycle is divided into at least one processing interval, such that one or more data can be received in at least one UE during a single DRX cycle. In other words, one UE or one UE group is basically designed to receive data during only a single processing interval contained in a single DRX cycle, such that several UEs are classified during only the single DRX cycle and data is then transmitted to the classified UEs. Also, the several UEs reduce an amount of power consumption during their shortest active period, and at the same time can receive necessary information.

If data associated with an objective UE cannot be transmitted using only a single processing time contained in the DRX cycle, the eNB transmits specific information to the objective UE, in which the specific information allows the objective UE to further receive at least one processing interval located behind the processing time allocated to the UE itself. By the specific information, the objective UE can receive information required for a current DRX cycle without waiting for a predetermined time ranging from a current DRX cycle to the next DRX cycle.

Therefore, according to one embodiment associated with the reception indicator used as the follow-up indicator, within each processing interval of the DRX cycle comprised of at least one processing interval allocated to one UE or one UE group, one UE or one UE group receives control information indicating the presence or absence of information transmitted from the eNB within the DRX cycle comprised of at least one processing interval. Also, the control information further includes the reception indicator acting as 'chaining information' (hereinafter referred to as chain information), which allows the UE or the UE group to indicate whether information is received in another processing interval of the above DRX cycle. The reception indicator includes information of at least one bit, and can be used in various ways according to system situations.

The information indicated by the above-mentioned reception indicator according to this embodiment of the present invention is as follows. If it is assumed that the above chain information is comprised of 2 bits, if the value of the reception indicator is '0', the UE or the UE group decides that no more data to be received exists in the processing interval of a current DRX cycle, receives only data information contained in a current processing interval, enters the sleep period, and re-enters the active mode within a processing interval of the next DRX cycle.

If the value of the reception indicator is 1, the UE or the UE group decides that its associated information has been transmitted to the next processing interval, receives the same information to a follow-up interval of the next processing interval, and receives necessary data in the follow-up interval. In this case, the reception indicator value contained in the next processing interval is also checked, such that it is determined whether information to be received exists in a follow-up processing interval. If the value of the reception indicator is 0 in the above-mentioned processing interval, the UE or the UE group enters the sleep period until reaching the next DRX cycle.

If the reception indicator is 2, the UE or the UE group determines whether its associated information has been transmitted in the range from a current processing time to a second processing interval, and inspects the reception indicator even in the above processing interval, such that it determines whether the above information will be continuously received by referring to the inspected reception indicator. Otherwise, the UE or the UE group determines whether its associated information has been transmitted from the current processing interval to a second processing interval. Thereafter, the UE or the UE group may directly enter the sleep mode without checking the reception indicator. If the UE or the UE group is operated and managed by the above-mentioned scheme, the network may not directly receive the UE or the reception indicator without transmitting the reception indicator in the range from the current processing interval.

In accordance with one embodiment of the present invention, control information including the above reception indicator may further include several-data reception activation indicators. These data reception activation indicators indicate whether a UE function capable of receiving several data units in one DRX cycle is activated. If there is no need for the UE to receive several data segments, the radio resources for the reception indicator are not allocated, but are used for other control information usages. Also, the above information, indicating the activation or deactivation of the above function for receiving several data segments, is used as basic information for receiving services from the eNB, such that it may be notified to the UE through the system information.

If the above-mentioned several-data reception activation indicator indicates the activation of the above function, then the UE investigates a reception indicator in a reception period contained in the DRX cycle. The eNB acting as a transmission end may properly transmit data according to the investigated result.

If several processing intervals are contained in the DRX cycle, a beginning point of an activation period of a UE or a specific UE group is derived from a UE's unique identity or a UE-group identity, and a DRX-period length. For example, if the UE's identity or the UE-group's identity is taken as a modulus based on a predetermined period of time corresponding to a DRX-cycle length, the modulo-operation result may be used as the beginning time of the DRX cycle. In accordance with one embodiment related to the reception indicator used as the follow-up indicator, the above-mentioned beginning time of the DRX cycle is called a frame offset. Specifically, if the paging information is transmitted at intervals of the DRX cycle, the above-mentioned beginning time is called a paging offset.

Figure 11:
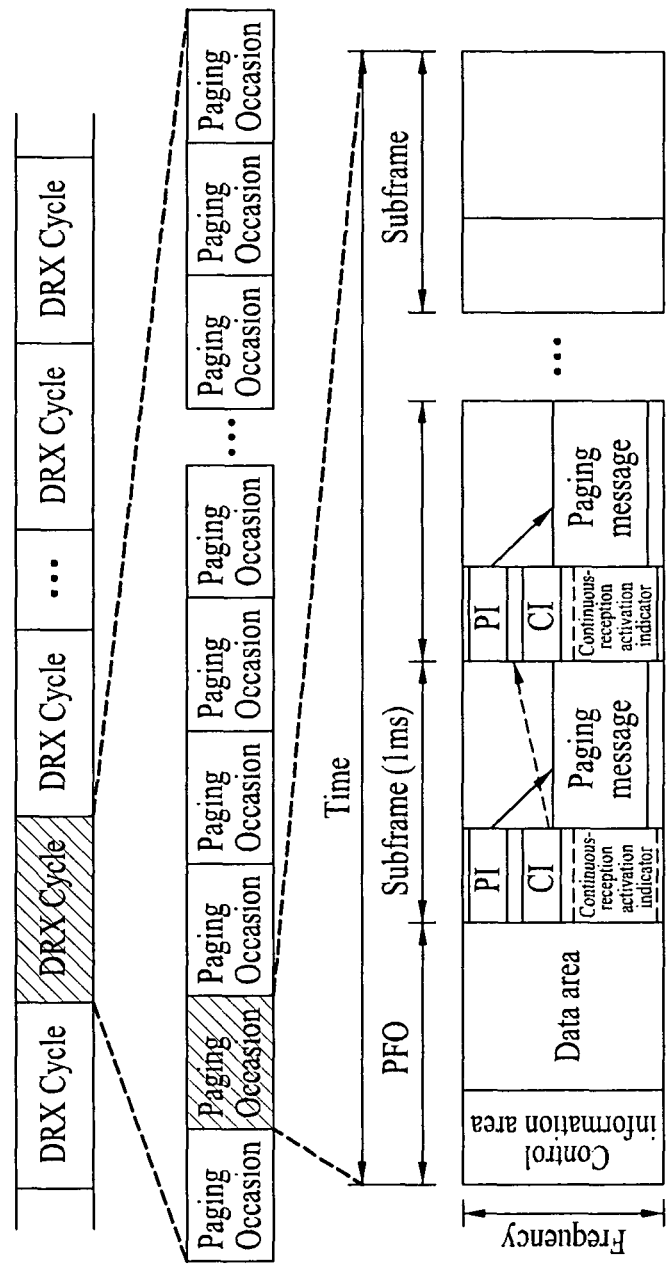
FIG. 11 is a conceptual diagram illustrating a paging-channel transmission scheme associated with a reception (Rx) indicator acting as the next or following indicator according to one embodiment of the present invention.

FIG. 11 is a conceptual diagram illustrating a paging-channel transmission scheme associated with reception (Rx) indicator acting as the next or following indicator according to one embodiment of the present invention. FIG. 11 shows one embodiment implemented when the OFDM transmission scheme such as the 3GPP LTE scheme is used, such that this embodiment can also be applied to other wireless communication systems without any prejudice.

As can be seen from the embodiment of FIG. 11, in order to prevent a paging message for a UE from being delayed and transmitted, the UE is able to receive the paging message during several TTIs contained in a single DRX cycle.

In FIG. 11, the eNB establishes a specific paging occasion at each paging period of a downlink paging channel for a specific UE or UE group, and constructs the paging occasion comprised of at least one paging frame, such that it uses the at least one paging frame so as to transmit the paging message to the UE. In this embodiment, the paging frame corresponds to at least one subframe. In this embodiment, a single paging frame corresponds to a single subframe.

A single paging frame includes paging control information and a paging message. One control information proposed by this embodiment may include paging information (e.g., PI or P-RNTI) acting as a paging indicator and a reception indicator related to follow-up data. The paging information indicates the presence or absence of the paging message. The reception indicator indicates the presence or absence of the paging control information. Therefore, the UE is able to decide a specific time at which the UE returns to the sleep mode using the above-mentioned reception indicator, such that this reception indicator can be called the sleeping indicator as previously stated above. The paging frame can be transmitted and received through a successive-subframe structure (e.g., 1st paging TTI→2nd paging TTI→3rd paging TTI) or a specific-interval subframe (e.g., (e.g., 1st paging TTI→3rd paging TTI→5th paging TTI). Concepts of the paging TTI will be described in detail. Detailed descriptions of the embodiment of FIG. 11 are as follows.

The eNB constructs a paging period used as a period for transmitting the paging message paging the UE or the UE group. The paging period information may be transmitted to the UE or UE group through the system information, etc. In order to solve a shortage of radio resources caused by the increasing paging channels of several UEs, the UEs are divided into some groups, and each UE determines the presence or absence of the paging message for a UE group associated with the UE itself during the paging process. If there is a paging message for this UE group, the UE determines whether its associated paging action actually occurs in a corresponding paging message.

In this case, a single DRX cycle may include at least one paging period or may include at least one DRX cycle in this single DRX cycle. The single paging period may include at least one paging occasion. A single paging occasion may include at least one subframe. Each subframe may have a specific length (e.g., 1 ms) corresponding to an integer multiple of a specific TTI. The LTE system may have a unique TTI of 1 ms. If the paging message is transmitted via the subframe, a paging control transmission channel (e.g., PDCCH) transmits P-RNTI for the paging-indicator purpose, such that the P-RNTI may indicate whether the paging message has been transmitted through the paging-message transport channel (e.g., PDSCH, DL-SCH, and PCH) being time-mapped to the paging-control transport channel.

In this case, the above-mentioned paging message is indicative of either a paging message of a specific UE or a paging message for a paging group including the specific UE. The PI-RNTI includes an identity of a UE group including the above UE or an identity of the above UE. PI-RNTI may indicate the presence or absence of the paging message without using the identity information, or may allow the paging message to indicate the UE identity or the UE-group identity. This paging message can be transmitted via at least one TTI. In this case, the eNB may indicate that the paging message is transmitted via several subframes, using chain information of the paging control information contained in a PDCCH of a subframe.

Also, a several-data reception activation indicator contained in the PDCCH may inform the UE or the UE group that the above paging message can be transmitted via at least two paging messages.

In this embodiment, it is assumed that a single paging period is allocated to a single DRX cycle, and the single paging period includes several paging occasions, and the UE or the UE group includes only one paging occasion within the single paging period.

In this embodiment, the TTI is prescribed in the DRX cycle of each UE or each UE-group, such that the paging message can be transmitted during one paging occasion. This TTI used for transmitting the paging message is also called a paging TTI. The eNB pre-recognizes an identity of a group including a specific UE or a specific UE identity, and links the identity to a specific paging TTI based on a specific paging occasion.

In FIG. 11, a difference between the beginning time of the paging occasion and the beginning time of a first paging TTI is called a paging frame offset. If several processing intervals exist in the DRX cycle, the beginning time of the UE activation time and the beginning time of the specific UE-group activation time are generally derived from a unique UE identity or UE-group identity and the DRX-cycle length. In the paging procedure, the UE identity or the UE-group identity are taken as a modulus based on a DRX-cycle length, such that the modulo-operation result may be used as the beginning time of the DRX cycle.

The eNB transmits paging information to UEs using system information or an RRC connection. In this embodiment, this paging information is transmitted over a PDCCH. By means of the above-mentioned paging information, the UE is able to recognize the paging occasion corresponding to the UE identity within the paging period, and is able to recognize the position of a first paging TTI established in a corresponding paging occasion. In this embodiment, a second TTI in the second paging occasion of a corresponding DRX cycle is used as a paging TTI for the UE or UE group.

If the paging information on the PDCCH includes paging information such as PI-RNTI associated with the UE, the UE is able to recognize that the PDSCH of a corresponding subframe has a paging message including both a paging cause and a UE identity. The UE receives the above paging message, and determines the presence or absence of its associated identity in the received paging message. If it is determined that the UE-associated identity exists in the received paging message, the UE answers the eNB by an RRC connection, and receives a necessary service from the eNB. However, the UE-associated paging information can be transmitted to the paging frame contained in a current paging occasion of a current DRC period, such that the UE confirms the paging information and the chain information. As described above, the chain information includes the length of at least one bit, and allows the UE to investigate successive paging frames or investigate another paging frame made after the lapse of a predetermined time.

In the above-mentioned embodiment of FIG. 11, it is assumed that the chain information includes the size of one bit. So, if the chain information has the value of 1, the UE investigates paging information of the next paging frame of the current paging frame. In this case, if the UE detects its associated paging identifier, it may investigate the paging message contained in the corresponding paging frame. If the paging information of this paging frame has no paging identifier associated with the UE, the UE may perform the same process by referring to the following chain information. The above-mentioned process may be continued until the value of the chain information becomes zero "0" or a paging time period of a current paging frame is terminated.

As described above, if the chain information is no longer required, the assignment of resources for the chain information is not required. In order to prevent the resources from being assigned, a several-data reception activation indicator comprised of at least one bit may be used, or the activation or deactivation of the several-data reception activation indicator may be notified to the UE by system information. As previously stated above, the PDCCH includes a several-data reception activation indicator such that the resultant PDCCH may be transmitted to the UE, and the activation or deactivation of the several-data reception activation may be notified to the UE through the medium of system information.

In the paging channel transmission scheme of FIG. 11, the UE receives the chain information used as one constituent element of the paging control information. If the chain information indicates that an additional paging frame or paging control information emerges, the UE may receive a paging frame applied to the next TTI of a current TTI or may receive only the paging control information. Distinction information, decided by the above chain information which indicates the additional paging frames or only the paging control information, may be implicitly decided between the eNB and the UE. By means of the above distinction information, this distinction information may be decided by either of the UE and the eNB, such that the decided distinction information may be notified from one of the UE and the eNB to the other one.

In accordance with the paging channel transmission scheme of FIG. 11, the UE receives chain information used as one constituent element of the paging control information. If the chain information indicates that an additional paging frame or paging control information emerges, the UE may receive a paging frame or paging control information to the extent of the next TTI indicated by the chain information after the lapse of a current TTI at which the above chain information is received.

In this case, the eNB may not transmit the chain information to the extent of the next TTI indicated by the above chain information after the lapse of the current TTI at which the UE receives the chain information. Also, the UE may not receive the chain information in the range to the extent of the TTI indicated by the chain information. The UE may enter the sleep mode in the range from the above TTI to the other TTI indicated by the chain information.

The paging control information includes indication information related to a paging message (e.g., PI), chain information, and several-data reception activation indication information. The paging control information may further include a RB (Resource Block) transmission format, subcarrier- and symbol-information, and AMC (Adaptive and Coding) and HARQ information. A transport channel of the paging control information is a L1/L2 control channel including a PDCCH. Paging cause information, UE identity information, and paging control information may be configured in the form of a control message through the medium of a paging message, such that this resulting control message may be contained in the paging message. A paging downlink shared channel (PDSCH), a Paging Channel (PCH), and a downlink shared channel (DL-SCH) may be used to transmit the paging control information.

The transport channel of the paging message may be any of a PDSCH, a PCH, and a DL-SCH. The paging control information, information for indicating whether several-paging frame transmission/reception is supported by a network, and CI and paging messages may be transmitted to the UE via the RRC signal. Also, the paging control information, information for indicating whether several-paging frame transmission/reception is supported by a network, and CI and paging messages can be transmitted to the UE by means of not only the RRC signal but also each PDCU of PDCP, RLC, and MAC layers.

Figure 12:
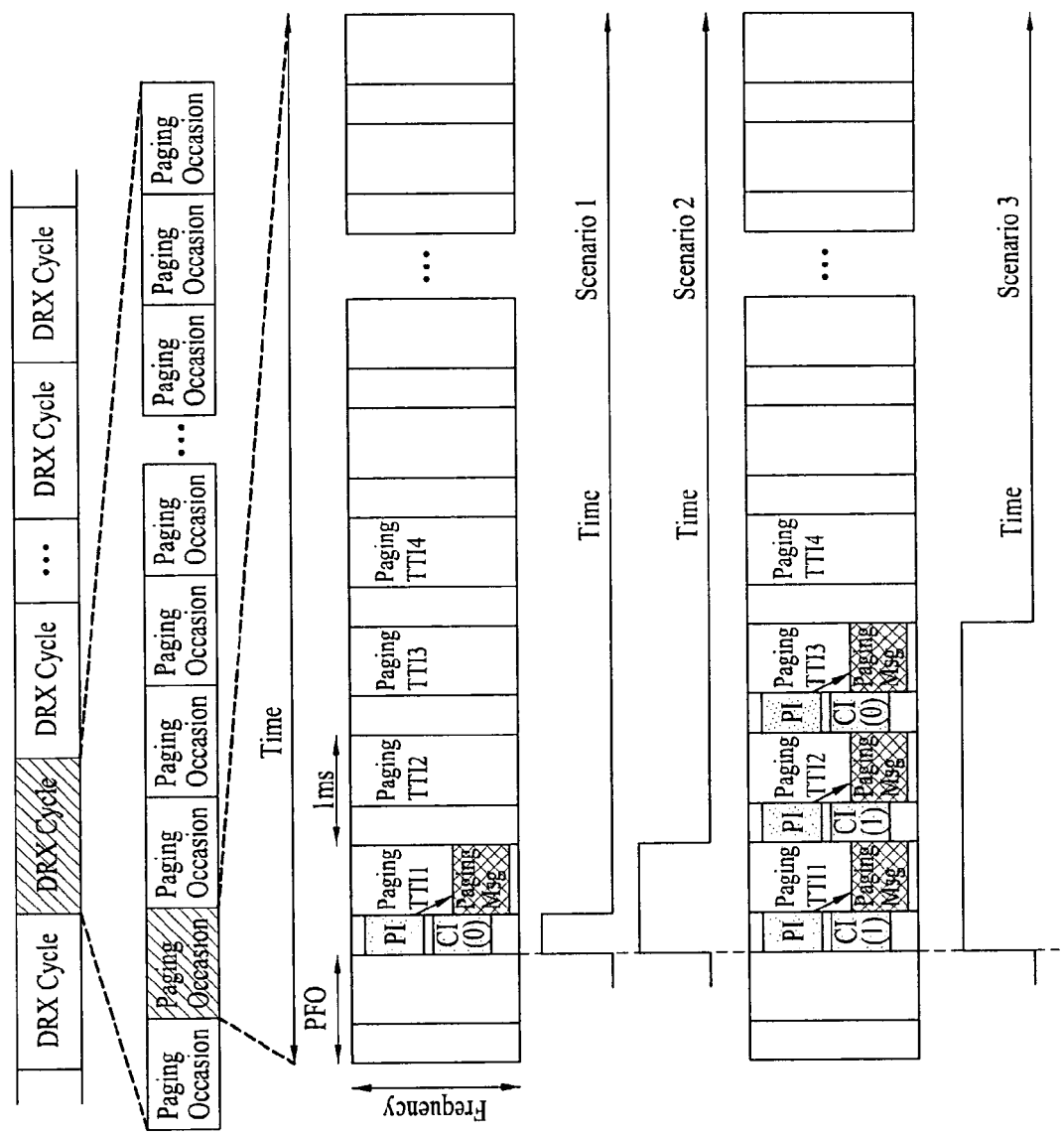
FIG. 12 shows Rx-indicator-based paging-channel transmission schemes of individual scenarios according to one embodiment of the present invention.

FIG. 12 shows Rx-indicator-based paging-channel transmission schemes of individual scenarios according to one embodiment of the present invention. In FIG. 12, it is assumed that a paging-channel transmission scheme is applied to one UE. One DRX cycle includes a plurality of paging occasions, and one paging occasion includes a plurality of paging frames corresponding to a subframe of the TTI length of 1 ms.

It is assumed that a paging frame offset (PFO) for the UE is set to 1. Namely, it is determined whether the UE is basically woken up at a second paging frame contained in a UE's paging time interval, such that the UE is able to recognize whether it is paged or not at the second paging frame. The chain information uses only one bit, and assumes that there is no several-data reception activation indicator. Other conditions and specifications related to an application system are the same as those of FIG. 11.

A first scenario of FIG. 12 shows that the eNB need not transmit the paging message to the UE in the DRX cycle. Therefore, there is no need to prescribe paging information (or PI-RNTI) contained in paging control information of a corresponding paging frame. The value of 0 is allocated to the chain information and the resulting chain information is transmitted.

If the PI contained in the received paging control information does not include the UE identity or the UE-group identity, or if the PI has no indication message for the paging message (i.e., if there is no PI-RNTI), the UE determines the absence of a paging message in the current paging frame, checks chain information, checks the value of 0, and enters the sleep mode. In this case, the chain information is represented by one bit, the value of 0 indicates that no paging control information is applied to the next TTI, and the value of 1 indicates that the paging control information is applied to the next TTI.

Referring to a second scenario of FIG. 12, if it is determined that the eNB can transmit the paging message to the UE using only the paging frame, the eNB sets a PI (e.g., PI-RNTI) of the paging control information, and keeps the chain information of 0. If the paging control information of the UE's paging frame contained in the PI includes a UE identity, or if the PI includes indication messages related to the paging message (i.e., if the PI-RNTI exists in the PI), the UE is able to receive the paging message of the transmitted paging frame during one TTI. The chain information does not indicate transmission of the next paging control information, such that the UE may enter the sleep mode.

A third scenario of FIG. 12 shows an exemplary case in which the eNB must transmit the paging message using chain information of 1 bit and several paging frames. In more detail, the network determines chain information of paging control information of paging frames corresponding to several paging TTIs from a first paging TTI to its successive paging TTIs to be '1', transmits the resulting paging message under the condition of the chain information of '1'. Chain information of paging control information of a paging frame via which the last paging message is transmitted is set to '0', such that the resulting paging message is transmitted under the condition of the chain information of '0'.

If the PI contained in the paging control information of the received paging frame includes the UE identity or the UE-group identity, or if the PI has an indication message for the paging message (i.e., if PI-RNTI exists in the PI), the UE can receive the paging message during one TTI. The chain information indicates transmission of the next paging control information (i.e., paging control information contained in first and second paging TTIs), such that the UE receives a paging frame of the next TTI without entering the sleep mode. Thereafter, by referring to the PI of the paging control information of the received paging frame, if the PI-RNTI is contained in the PI, the UE is able to receive the paging message. If the chain information of the last paging control information (i.e., paging control information contained in the first paging TTI) is 0, this chain information of 0 indicates that there is no paging control information in the next TTI, such that the UE receives the paging message of the third paging frame and then re-enters the sleep mode.

Figure 13:
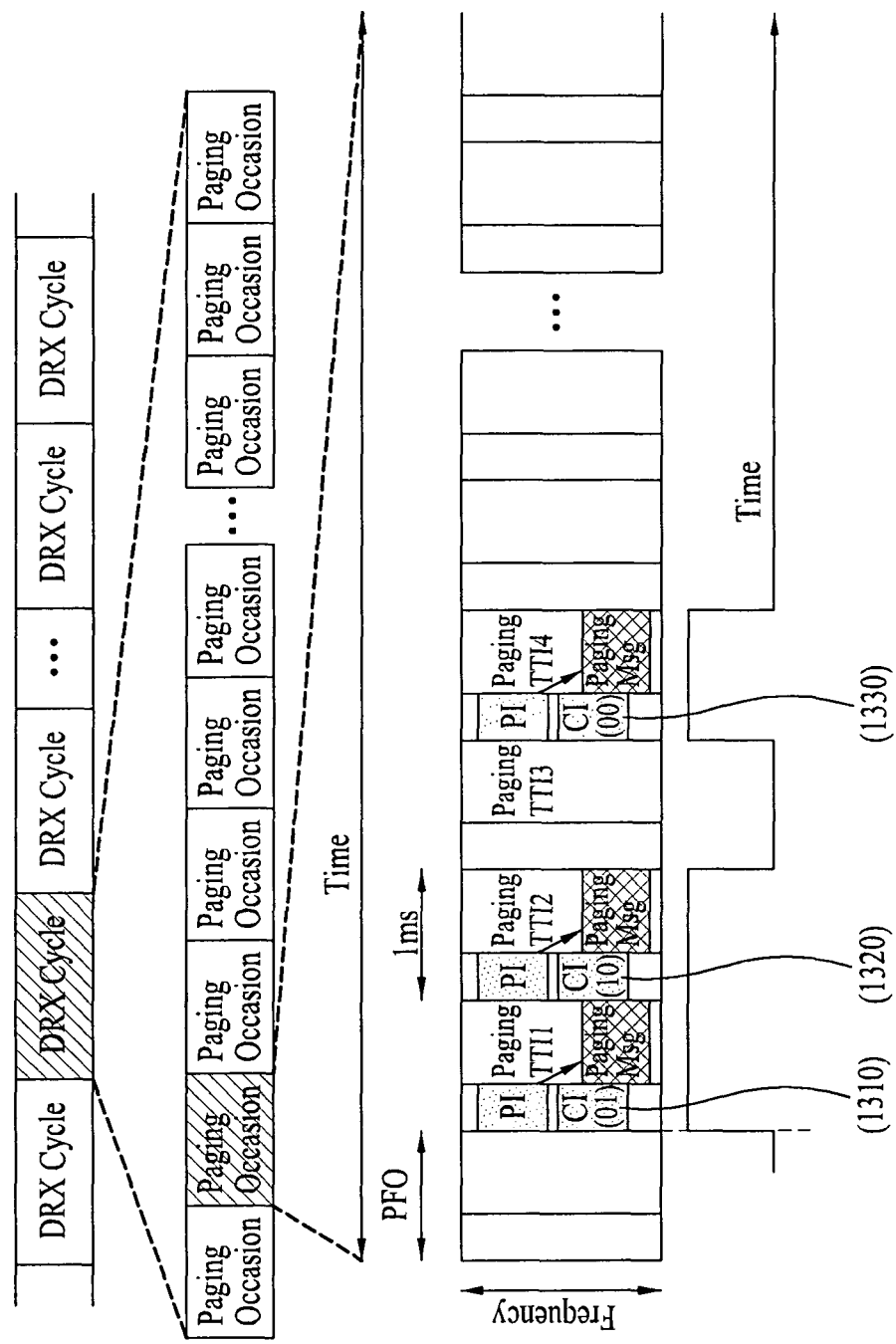
FIG. 13 shows scenarios for use in paging-channel transmission schemes based on a reception (Rx) indicator according to another embodiment of the present invention.

FIG. 13 shows scenarios for use in paging-channel transmission schemes based on a reception (Rx) indicator according to another embodiment of the present invention. In FIG. 13, it is assumed that the chain information includes 2 bits, differently from FIG. 12. Other assumptions of FIG. 13 are the same as those of FIG. 12.

In the embodiment of FIG. 13, the eNB transmits the paging message using the chain information comprised of 2 bits and several paging frames, such that the chain information of the paging control frame may further include specific indication information indicating whether the UE must receive paging frames in the range from a current Rx paging frame to a third paging frame located behind the current Rx paging frame. As shown in FIG. 13, the UE checks the PI at its own paging TTI. If the UE identity or PI-RNTI associated with the UE exists in the checked PI, the UE receives a paging message contained in a corresponding paging frame Thereafter, the UE checks chain information. Referring to FIG. 13, first chain information 1310 indicates the value of 1, such that the UE checks the next paging frame without entering the sleep mode. In the next paging frame (i.e., a second paging frame), the UE inspects paging information and associated paging messages in the same manner as in the first paging frame, and then inspects the chain information 1320. The chain information 1320 of the second paging frame has the value of 2, such that the UE enters the sleep mode at a third paging frame and is then awakened from the sleep mode to receive the next paging frame. In this way, the paging information is examined in even this paging frame where the UE was woken up, and the UE determines whether the paging message will be received or not at this paging frame. In this case, this chain information 1330 indicates the value of 0, such that the UE enters the sleep mode and is activated at a paging TTI of the next DRX cycle.

In FIG. 13, a binary value of the chain information proposed by the present invention can be defined as a decimal value (11:1*2+1=3), an octal value (11:1*8+1=9), or hexadecimal value (11:1*16+1=17).

Next, according to another embodiment of the present invention, this embodiment is used to transmit data (e.g., system information) using as a reception indicator used as a follow-up indicator. A representative one of the principle functions conducted in the RRC layer is a Broadcast of System Information (BSI) service which informs the UE of the system information. The system information includes system information which allows an idle-mode UE to access the network, mobility support and measurement information for a connected-mode UE, etc. This system information uses the BCCH as a logical channel, and uses a Broadcast Channel (BCH) or a Forward Access Channel (FACH) as a transport channel.

In order to systematically transmit the above system information, the RRC layer groups a plurality of system information having similar characteristics such that it configures a System Information Block (SIB). System information contained in different SIBs has different contents and different transmission characteristics. In the case of the LTE system, the most basic information (e.g., bandwidth) contained in the above system information is transmitted over a PBCH used as a physical channel, a BCH used as a transport channel, and a BCCH used as a logical channel, such that the LTE system can receive a desired service within a cell. The above-mentioned SIB may be transmitted to the UE over a PDCCH/PDSCH used as a physical channel, a DL-SCH used as a transport channel, and a BCCH used as a logical channel.

Accordingly, even when data information such as system information is transmitted to the UE, and/or even when the UE receives several data units, the follow-up data can be successively received by the reception indicator, or the follow-up data generated after the lapse of a predetermined number of intervals can be received.

A method for transmitting the above system to the UE or the UE group will hereinafter be described in detail.

Firstly, the eNB establishes a UE-associated transmission occasion for each downlink transmission cycle. The transmission occasion may be decided by a variety of specific events decided by the relationship between the eNB and the UE. For example, an event may indicate whether a current time reaches a specific time implicitly or explicitly decided by the relationship between the eNB and the UE, another event indicates data which must be transmitted to the UE, or still another event indicates that the UE requests system information. Next, if the eNB reaches a transmission occasion or a specific time implicitly or explicitly decided by the relationship between the eNB and the UE, or if the eNB transmits the transmission message using several subframes at a specific time caused by the occurrence of the specific event, the chain information is added to transmission control information. The transmission control information including the above chain information may be allocated to a transmission control channel corresponding to a PDCCH contained in the subframe, or may be allocated to a data channel corresponding to a PDSCH.

Thereafter, if a current subframe is completely configured, the eNB determines whether the next subframe of the current subframe is equal to the last subframe. If it is determined that the next subframe is not equal to the last subframe, the eNB may add the above chain information indicating the presence of a subframe to be received to transmission control information of the next subframe. Otherwise, in the same manner as in FIG. 13, the chain information may indicate successive transmission of a predetermined number of subframes, or may indicate that the predetermined number of subframes are transmitted at intervals of a predetermined time.

Also, in case of chain information occupying several bits, this chain information may be used as indication information indicating that subframes corresponding to a bit value marked therein are successively received. In other words, if chain information contained in transmission control information in a current subframe is comprised of 2 bits, and the value of this chain information is a binary value '10', the resulting chain information of '10' may indicate reception of subframes generated after the lapse of a second subframe spaced apart from a current subframe, or may indicate that two additional subframes from the current subframe must be successively received.

If the latter case in which two additional subframes must be successively received is preengaged between the UE and the eNB, the process for adding the chain information to the transmission control information of the follow-up subframes of the current subframe may be omitted without any prejudice. In the former case indicating the reception of subframes generated after the lapse of the second subframe, if the eNB determines the next subframe to be the last subframe, the value '0' indicating the last subframe is applied to the chain information and then the system information transmission procedure may be terminated.

Based on the chain information of the received transmission control information, the UE is able to determine whether it must continuously receive data in the next subframe after the lapse of the current subframe.

If the chain information includes a plurality of bits, according to the chain-information management method recognized by the UE on the basis of the system information, the UE determines whether to continuously receive a predetermined number of subframes corresponding to the marked number, or determines whether to receive subframes after the predetermined number of subframes have elapsed, such that the UE receives the resulting subframes. The above-mentioned chain information management scheme may be initiated when the UE requests this chain information management scheme from the network.

For the convenience of description and better understanding of the present invention, the above-mentioned embodiments have mainly disclosed a communication execution process between the transmission end and the reception end, but it should be noted that the transmission end may be a user equipment (UE) or an eNode-B of the network, and the reception end may be an eNode-B or UE of the network. If required, individual constituent components or characteristics may be combined with other components or characteristics. Also, some constituent components and/or characteristics may be combined to implement the embodiments of the present invention. The order of operations disclosed in the embodiments of the present invention may be changed to another. Some components or characteristics of any embodiment may also be included in other embodiments, or may be replaced with those of the other embodiments as necessary. For example, the user equipment (UE) may be replaced with a mobile station (MS), a mobile subscriber station (MSS), or a communication terminal as necessary. The term "eNode-B" may also be replaced with a fixed station, Node-B (NB), or eNB as necessary.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

As apparent from the above description, the present invention can be applied to a method for transmitting and receiving data in a mobile communication system. More specifically, the present invention can be applied to a method for transmitting and receiving data in a multiple-carrier mobile communication system designed to use multiple carriers.

The invention claimed is:

1. A method of transmitting data to at least one reception end in a discontinuous reception (DRX) cycle comprising a plurality of paging occasions (POs) in a mobile communication system, the method comprising:
   transmitting first control information comprising a 2-bit reception indicator via a first physical control channel at a first PO of the DRX cycle, the first physical control channel being cyclic redundancy check (CRC)-masked with a paging radio network temporary identifier (RNTI),
   wherein if the 2-bit reception indicator has a first value, the at least one reception end receives second control information via a second physical control channel at a next PO of the first PO in the DRX cycle, the second physical control channel being CRC-masked with the paging RNTI,
   wherein if the 2-bit reception indicator has a second value, the at least one reception end enters a sleep mode at the next PO of the first PO in the DRX cycle and wakes up to receive third control information via a third physical control channel at a next PO of the next PO of the first PO in the DRX cycle, the third physical control channel being CRC-masked with the paging RNTI,
   wherein the paging RNTI indicates that each of the first physical control channel, the second physical control channel and the third physical control channel is used for receiving a paging message,
   wherein if the 2-bit reception indicator has a third value, the at least one reception end enters a sleep mode from the next PO of the first PO to a last PO in the DRX cycle, and
   wherein each of the plurality of POs corresponds to a 1 millisecond time interval.

2. The method according to claim 1, wherein if the 2-bit reception indicator indicates that the first physical control channel is not the last physical control channel in the DRX cycle, the 2-bit reception indicator further indicates a location of a second PO in the DRX cycle.

3. The method according to claim 1, further comprising:
   transmitting one or more physical control channels at one or more of the plurality of POs after the first PO if the 2-bit reception indicator indicates that the first physical control channel is not the last physical control channel in the DRX cycle.

4. The method according to claim 1, wherein each of the first physical control channel, the second physical control channel, and the third physical control channel is a physical downlink control channel (PDCCH).

5. The method according to claim 1, wherein the first, second and third control information further comprise at least one of paging control information or system information reception control information for the at least one reception end.

6. The method according to claim 5, wherein the paging control information indicates whether there is the paging message for the at least one reception end.

7. The method according to claim 1, the method further comprising:
   transmitting data via a physical data channel controlled by the first physical control channel if the first physical control channel includes paging indicator information,
   wherein the first control information further comprises data transmission control information related to a transmission format or receiving scheme of the data transmitted via the physical data channel.

8. The method according to claim 7, wherein the data transmitted via the physical data channel includes at least one of the paging message, system information, data transmission information, or user data for the at least one reception end.

9. The method according to claim 7, wherein the physical data channel is a physical downlink shared channel (PDSCH).

10. A method of receiving data from a transmission end in a discontinuous reception (DRX) cycle comprising a plurality of paging occasions (POs) in a mobile communication system, the method comprising:
    receiving first control information comprising a 2-bit reception indicator via a first physical control channel at a first PO of the DRX cycle, the first physical control channel being cyclic redundancy check (CRC)-masked with a paging radio network temporary identifier (RNTI);
    receiving second control information via a second physical control channel at a next PO of the first PO in the DRX cycle if the 2-bit reception indicator has a first value, the second physical control channel being CRC-masked with the paging RNTI;
    entering a sleep mode at the next PO of the first PO in the DRX cycle and waking up to receive third control information via a third physical control channel at a next PO of the next PO of the first PO in the DRX cycle if the 2-bit reception indicator has a second value, the third physical control channel being CRC-masked with the paging RNTI; and
    entering a sleep mode from the next PO of the first PO to a last PO in the DRX cycle if the 2-bit reception indicator has a third value, wherein the paging RNTI indicates that each of the first physical control channel, the second physical control channel and the third physical control channel is used for receiving a paging message, and wherein each of the plurality of POs corresponds to a 1 millisecond time interval.

11. The method according to claim 10, wherein if the 2-bit reception indicator indicates that the first physical control channel is not the last physical control channel in the DRX cycle, the 2-bit reception indicator further indicates a location of a second PO in the DRX cycle.

12. The method according to claim 10, further comprising:
receiving one or more physical control channels at one or more of the plurality of POs after the first PO if the 2-bit reception indicator indicates that the first physical control channel is not the last physical control channel in the DRX cycle.

13. The method according to claim 10, wherein each of the first physical control channel, the second physical control channel, and the third physical control channel is a physical downlink control channel (PDCCH).

14. The method according to claim 10, wherein the first, second and third control information further comprise at least one of paging control information or system information reception control information.

15. The method according to claim 14, wherein the paging control information indicates whether there is the paging message for a reception end.

16. The method according to claim 14, further comprising:
   receiving data via a physical data channel controlled by the first physical control channel if the first physical control channel includes paging indicator information,
   wherein the first control information further comprises data transmission control information related to a transmission format or receiving scheme of the data received via the physical data channel.

17. The method according to claim 16, wherein the data received via the physical data channel includes at least one of the paging message, system information, data transmission information, or user data for a reception end.

18. The method according to claim 16, wherein the physical data channel is a physical downlink shared channel (PDSCH).

* * * * *